(12) United States Patent
Funada et al.

(10) Patent No.: US 10,746,946 B2
(45) Date of Patent: Aug. 18, 2020

(54) HOST BOARD, OPTICAL RECEIVER, OPTICAL TRANSMITTER, OPTICAL TRANSCEIVER, AND METHOD OF MOUNTING OPTICAL TRANSCEIVER ON HOST BOARD

(71) Applicant: Sumitomo Electric Industries, Ltd., Osaka-shi, Osaka (JP)

(72) Inventors: Tomoyuki Funada, Osaka (JP); Daisuke Umeda, Osaka (JP); Naruto Tanaka, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 16/321,140

(22) PCT Filed: May 19, 2017

(86) PCT No.: PCT/JP2017/018820
§ 371 (c)(1),
(2) Date: Jan. 28, 2019

(87) PCT Pub. No.: WO2018/037642
PCT Pub. Date: Mar. 1, 2018

(65) Prior Publication Data
US 2019/0170951 A1    Jun. 6, 2019

(30) Foreign Application Priority Data

Aug. 26, 2016  (JP) ................................. 2016-166111
Dec. 5, 2016   (JP) ................................. 2016-236075

(51) Int. Cl.
*G02B 6/42*   (2006.01)
*H04J 14/02*  (2006.01)
(Continued)

(52) U.S. Cl.
CPC ........... *G02B 6/424* (2013.01); *G02B 6/3897* (2013.01); *G02B 6/426* (2013.01); *G02B 6/428* (2013.01);
(Continued)

(58) Field of Classification Search
None
See application file for complete search history.

(56) References Cited

U.S. PATENT DOCUMENTS

2005/0232555 A1* 10/2005 Rosenberg ........... G02B 6/4201
                                                 385/88
2008/0225882 A1*  9/2008 Atsumi ................. H04J 3/1611
                                                 370/463

(Continued)

FOREIGN PATENT DOCUMENTS

JP     2008-227993 A    9/2008
WO     WO-2010/103970 A1 9/2010

OTHER PUBLICATIONS

"CFP MSA CFP4 Hardware Specification, Revision 1.1", http://www.cfp-msa.org/Documents/CFP-MSA_CFP4_HW-Spec-rev.1.1.pdf, Mar. 18, 2015, 34 pages.

*Primary Examiner* — Darren E Wolf
(74) *Attorney, Agent, or Firm* — Faegre Drinker Biddle & Reath LLP

(57) ABSTRACT

A host board for mounting an optical transceiver includes a connector that is configured to attach thereto and detach therefrom an optical transceiver having at least one lane and includes electrical contacts as many as the at least one lane, a management unit configured to receive lane information regarding the at least one lane of the optical transceiver from the optical transceiver through the connector and specify an available electrical contact, and a communication unit configured to communicate with the optical transceiver through the connector. The communication unit is configured to
(Continued)

communicate information with the optical transceiver through the electrical contact specified by the management unit.

22 Claims, 36 Drawing Sheets

(51) Int. Cl.
  *G02B 6/38*    (2006.01)
  *H04B 10/60*   (2013.01)
  *H04B 10/40*   (2013.01)
  *H04B 10/50*   (2013.01)

(52) U.S. Cl.
  CPC ......... *G02B 6/4246* (2013.01); *G02B 6/4286* (2013.01); *G02B 6/4292* (2013.01); *H04J 14/02* (2013.01); *H04B 10/40* (2013.01); *H04B 10/50* (2013.01); *H04B 10/60* (2013.01)

(56) References Cited

U.S. PATENT DOCUMENTS

| | | |
|---|---|---|
| 2010/0103970 A1* | 4/2010 | Shigihara ............... B82Y 20/00 372/45.01 |
| 2011/0103797 A1 | 5/2011 | Oki et al. |
| 2011/0299858 A1 | 12/2011 | Mazzini et al. |
| 2012/0039614 A1 | 2/2012 | Miura |
| 2016/0149643 A1 | 5/2016 | Kasai et al. |

* cited by examiner

FIG.8

| LANE SUPPORT INFORMATION | | |
|---|---|---|
| TRANSMISSION | Lane1 | PRESENCE/ABSENCE |
| | Lane2 | PRESENCE/ABSENCE |
| | Lane3 | PRESENCE/ABSENCE |
| | Lane4 | PRESENCE/ABSENCE |
| RECEPTION | Lane1 | PRESENCE/ABSENCE |
| | Lane2 | PRESENCE/ABSENCE |
| | Lane3 | PRESENCE/ABSENCE |
| | Lane4 | PRESENCE/ABSENCE |

FIG.9

| LANE WAVELENGTH INFORMATION | | |
|---|---|---|
| TRANSMISSION | Lane1 | $\lambda t1$ |
| | Lane2 | $\lambda t2$ |
| | Lane3 | $\lambda t3$ |
| | Lane4 | $\lambda t4$ |
| RECEPTION | Lane1 | $\lambda r1$ |
| | Lane2 | $\lambda r2$ |
| | Lane3 | $\lambda r3$ |
| | Lane4 | $\lambda r4$ |

FIG.10

| REGISTER | DEFINITION | |
|---|---|---|
| Transmitter lane [3:0] | [3] Lane 3 | 1: IMPLEMENTED, 0: UNIMPLEMENTED |
| | [2] Lane 2 | 1: IMPLEMENTED, 0: UNIMPLEMENTED |
| | [1] Lane 1 | 1: IMPLEMENTED, 0: UNIMPLEMENTED |
| | [0] Lane 0 | 1: IMPLEMENTED, 0: UNIMPLEMENTED |
| Receiver lane [3:0] | [3] Lane 3 | 1: IMPLEMENTED, 0: UNIMPLEMENTED |
| | [2] Lane 2 | 1: IMPLEMENTED, 0: UNIMPLEMENTED |
| | [1] Lane 1 | 1: IMPLEMENTED, 0: UNIMPLEMENTED |
| | [0] Lane 0 | 1: IMPLEMENTED, 0: UNIMPLEMENTED |
| Transmitter wavelength [7:0] | [7:6] Lane 3 | 3: $\lambda t3$, 2: $\lambda t2$, 1: $\lambda t1$, 0: $\lambda t0$ |
| | [5:4] Lane 2 | 3: $\lambda t3$, 2: $\lambda t2$, 1: $\lambda t1$, 0: $\lambda t0$ |
| | [3:2] Lane 1 | 3: $\lambda t3$, 2: $\lambda t2$, 1: $\lambda t1$, 0: $\lambda t0$ |
| | [1:0] Lane 0 | 3: $\lambda t3$, 2: $\lambda t2$, 1: $\lambda t1$, 0: $\lambda t0$ |
| Receiver wavelength [7:0] | [7:6] Lane 3 | 3: $\lambda r3$, 2: $\lambda r2$, 1: $\lambda r1$, 0: $\lambda r0$ |
| | [5:4] Lane 2 | 3: $\lambda r3$, 2: $\lambda r2$, 1: $\lambda r1$, 0: $\lambda r0$ |
| | [3:2] Lane 1 | 3: $\lambda r3$, 2: $\lambda r2$, 1: $\lambda r1$, 0: $\lambda r0$ |
| | [1:0] Lane 0 | 3: $\lambda r3$, 2: $\lambda r2$, 1: $\lambda r1$, 0: $\lambda r0$ |

FIG.11

| TRANSMISSION CAPACITY SUPPORT INFORMATION | |
|---|---|
| TRANSMISSION | 25G, 50G, 100G |
| RECEPTION | 25G, 50G, 100G |

FIG.51

| LANE SUPPORT INFORMATION | | |
|---|---|---|
| TRANSMISSION | Lane0 | PRESENCE/ABSENCE |
| | Lane1 | PRESENCE/ABSENCE |
| | Lane2 | PRESENCE/ABSENCE |
| | Lane3 | PRESENCE/ABSENCE |
| | Lane4 | PRESENCE/ABSENCE |
| RECEPTION | Lane0 | PRESENCE/ABSENCE |
| | Lane1 | PRESENCE/ABSENCE |
| | Lane2 | PRESENCE/ABSENCE |
| | Lane3 | PRESENCE/ABSENCE |
| | Lane4 | PRESENCE/ABSENCE |

FIG.52

| LANE WAVELENGTH INFORMATION | | |
|---|---|---|
| TRANSMISSION | Lane0 | $\lambda t0$ |
| | Lane1 | $\lambda t1$ |
| | Lane2 | $\lambda t2$ |
| | Lane3 | $\lambda t3$ |
| | Lane4 | $\lambda t4$ |
| RECEPTION | Lane0 | $\lambda r0$ |
| | Lane1 | $\lambda r1$ |
| | Lane2 | $\lambda r2$ |
| | Lane3 | $\lambda r3$ |
| | Lane4 | $\lambda r4$ |

FIG.53

| TRANSMISSION CAPACITY SUPPORT INFORMATION | |
|---|---|
| TRANSMISSION | 10G, 25G, 50G, 100G |
| RECEPTION | 10G, 25G, 50G, 100G |

# HOST BOARD, OPTICAL RECEIVER, OPTICAL TRANSMITTER, OPTICAL TRANSCEIVER, AND METHOD OF MOUNTING OPTICAL TRANSCEIVER ON HOST BOARD

TECHNICAL FIELD

The present invention relates to a host board, an optical receiver, an optical transmitter, an optical transceiver, and a method of mounting an optical transceiver on a host board. The present application claims a priority based on Japanese Patent Application No. 2016-166111 filed on Aug. 26, 2016 and Japanese Patent Application No. 2016-236075 filed on Dec. 5, 2016, the entire contents of which are incorporated herein by reference.

BACKGROUND ART

The transmission capacity in optical communications has been dramatically increased. In recent years, optical communications having a transmission capacity of 40 Gbps or 100 Gbps have been proposed. For example, in optical communications of 40 Gbps, four optical signals having a rate of 10 Gbps and different wavelengths are multiplexed. In optical communications of 100 Gbps, four optical signals of 25 Gbps or ten optical signals of 10 Gbps are multiplexed.

In order to achieve a transmission capacity of 40 Gbps or 100 Gbps, the transmission capacity of the optical transceiver has been expanded. For example, "CFP MSA CFP4 Hardware Specification, Revision 1.1" (NPL 1) discloses an optical transceiver for supporting a 40 Gbps interface and a 100 Gbps interface for, for example, Ethernet (registered trademark) and telecommunications.

For example, US Patent Application Publication No. 2016/0149643 (PTL 1) discloses an optical transceiver including an integration of four optical devices each having a transmission rate of 10 Gbps. The optical transceiver multiplexes four optical signals having different wavelengths to equivalently obtain transmission rates of 40 Gbps and 100 Gbps. For example, US Patent Application Publication No. 2011/0103797 (PTL 2) discloses an optical transceiver including four separate optical devices.

CITATION LIST

Patent Literature

PTL 1: US Patent Application Publication No. 2016/0149643
PTL 2: US Patent Application Publication No. 2011/0103797

Non Patent Literature

NPL 1: "CFP MSA CFP4 Hardware Specification, Revision 1.1", http://www.cfp-msa.org/Documents/CFP-MSA_CFP4_HW-Spec-rev1.1.pdf

SUMMARY OF INVENTION

A host board according to an aspect of the present invention is a host board for mounting an optical transceiver, and includes a connector, a management unit, and a communication unit. The connector is configured to attach thereto and detach therefrom the optical transceiver having at least one lane and includes at least one electrical contact as many as the at least one lane. The management unit is configured to receive lane information regarding the at least one lane of the optical transceiver from the optical transceiver through the connector and specify the at least one electrical contact that is available. The communication unit is configured to communicate with the optical transceiver through the connector. The communication unit is configured to communicate information with the optical transceiver through the at least one electrical contact specified by the management unit.

An optical receiver according to an aspect of the present invention includes a wavelength demultiplexing, at least one optical reception unit, an interface, and a communication unit. The wavelength demultiplexing unit is configured to demultiplex at least one optical signal to be received from an optical signal transmitted through an optical fiber and subjected to wavelength multiplexing. The at least one optical reception unit is configured to receive the at least one optical signal to be received and output an electric signal. The interface includes an electrical contact for outputting the electric signal from the at least one optical reception unit to a host board. The communication unit is configured to notify the host board of information for specifying an electrical contact available for transmitting the electric signal from the at least one optical reception unit to the host board and the at least one optical reception unit.

An optical transmitter according to an aspect of the present invention includes at least one optical transmission unit, a wavelength multiplexing unit, an interface, and a communication unit. The at least one optical transmission unit is configured to receive an electric signal from a host board and transmit at least one optical signal having an identical wavelength or different wavelengths. The wavelength multiplexing unit is configured to transmit the at least one optical signal from the at least one optical transmission unit to an optical fiber, and when the at least one optical signal from the at least one optical transmission unit has different wavelengths, transmit an optical signal subjected to wavelength multiplexing to the optical fiber. The interface includes an electrical contact for receiving an electric signal from the host board. The communication unit is configured to notify the host board of information for specifying the electrical contact available for transmitting the electric signal from the host board to the at least one optical transmission unit and the at least one optical transmission unit.

An optical transceiver according to an aspect of the present invention includes a wavelength demultiplexing unit, a wavelength multiplexing unit, at least one optical reception unit, at least one optical transmission unit, an interface, and a communication unit. The wavelength demultiplexing unit is configured to demultiplex at least one optical signal to be received from an optical signal transmitted through an optical fiber and subjected to wavelength multiplexing. The wavelength multiplexing unit is integral with the wavelength demultiplexing unit or separate from the wavelength demultiplexing unit. The at least one optical reception unit is configured to receive the at least one optical signal to be received. The at least one optical transmission unit is configured to receive an electric signal from a host board and output an optical signal. The interface has a first electrical contact for receiving an electric signal from the host board, and a second electrical contact for outputting an electric signal from the at least one optical reception unit to the host board. The communication unit is configured to notify the host board of information for specifying the at least one optical reception unit, the at least one optical transmission unit, the first electrical contact available for transmitting the electric signal from the host board to the at least one optical transmission unit, and the second electrical contact available for transmitting the electric signal from the at least one optical reception unit to the host board.

A method of mounting an optical transceiver on a host board according to an aspect of the present invention includes connecting an optical transceiver storing lane information to a connector of a host board, reading the lane information from the optical transceiver, determining the number of lanes based on the lane information, and performing control for multi-lane distribution based on the number of lanes.

A host board according to an aspect of the present invention is a host board for mounting an optical transceiver, and includes a connector, a management unit, and a communication unit. The connector is configured to attach thereto and detach therefrom the optical transceiver having at least one lane. The management unit is configured to receive lane information regarding an available lane of the optical transceiver from the optical transceiver through the connector and specify the available lane. The communication unit is configured to communicate with the optical transceiver through the connector. The communication unit is configured to communicate data with the optical transceiver. The data is transmitted through the available lane specified by the management unit.

An optical receiver according to an aspect of the present invention includes a wavelength demultiplexing unit, at least one optical reception unit, an interface, and a communication unit. The wavelength demultiplexing unit is configured to demultiplex at least one optical signal to be received from an optical signal transmitted through an optical fiber and subjected to wavelength multiplexing. The at least one optical reception unit is configured to receive the at least one optical signal to be received and output an electric signal. The interface is provided for outputting an electric signal from the at least one optical reception unit to a host board. The communication unit is configured to notify the host board of information for specifying a lane available for transmitting the electric signal from the at least one optical reception unit to the host board and the at least one optical reception unit.

An optical transmitter according to an aspect of the present invention includes at least one optical transmission unit, a wavelength multiplexing unit, an interface, and a communication unit. The at least one optical transmission unit is configured to receive an electric signal from a host board and transmit at least one optical signal having an identical wavelength or different wavelengths. The wavelength multiplexing unit is configured to transmit the at least one optical signal from the at least one optical transmission unit to an optical fiber, and when the at least one optical signal from the at least one optical transmission unit has different wavelengths, transmit an optical signal subjected to wavelength multiplexing to the optical fiber. The interface is provided for receiving an electric signal from the host board. The communication unit is configured to notify the host board of information for specifying a lane available for transmitting the electric signal from the host board to the at least one optical transmission unit and the at least one optical transmission unit.

An optical transceiver according to an aspect of the present invention includes a wavelength demultiplexing unit, a wavelength multiplexing unit, at least one optical reception unit, at least one optical transmission unit, an interface, and a communication unit. The wavelength demultiplexing unit is configured to demultiplex at least one optical signal to be received from an optical signal transmitted through an optical fiber and subjected to wavelength multiplexing. The wavelength multiplexing unit is integral with the wavelength demultiplexing unit or separate from the wavelength demultiplexing unit. The at least one optical reception unit is configured to receive the at least one optical signal to be received. The at least one optical transmission unit is configured to receive an electric signal from a host board and output an optical signal. The interface is provided for receiving an electric signal from the host board and outputting an electric signal from the at least one optical reception unit to the host board. The communication unit is configured to notify the host board of information for specifying the at least one optical reception unit, the at least one optical transmission unit, and a lane available for transmitting the electric signal from the host board to the at least one optical transmission unit and transmitting the electric signal from the at least one optical reception unit to the host board.

BRIEF DESCRIPTION OF DRAWINGS

FIG. 8 shows a first example of lane information.

FIG. 9 shows a second example of lane information.

FIG. 10 shows an example configuration of lane information stored in an optical transceiver.

FIG. 11 shows a third example of lane information.

FIG. 51 shows a first example of lane information according to Embodiment 2.

FIG. 52 shows a second example of lane information according to Embodiment 2.

FIG. 53 shows a third example of lane information according to Embodiment 2.

DETAILED DESCRIPTION

Figure 1:
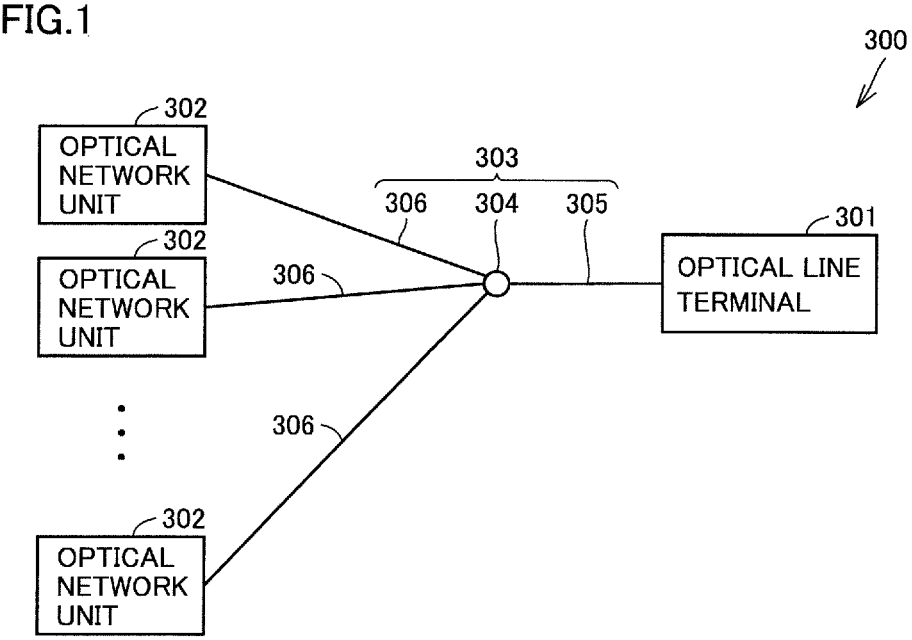
FIG. 1 shows an example configuration of an optical communication system according to an embodiment.

Problem to be Solved by the Present Disclosure

For example, in Ethernet (registered trademark) passive optical network (EPON), 25 G, 50 G, and 100 G-EPONs have been standardized (IEEE P802.3ca). It is conceivable that as a scenario for introducing the above, transmission capacity may be expanded (upgraded) incrementally.

Each of the above literatures discloses an optical transceiver capable of achieving a specific transmission capacity (e.g., 40 Gbps). Each literature, however, does not specifically disclose incremental changes in transmission capacity.

An object of the present disclosure is to provide configurations of an optical transceiver and a host board for optical communications in which transmission capacity can be incrementally changed.

Description of Embodiments

Embodiments of the present invention will initially be listed and described.

(1) A host board according to an aspect of the present invention is a host board for mounting an optical transceiver, and includes a connector, a management unit, and a communication unit. The connector is configured to attach thereto and detach therefrom the optical transceiver having at least one lane and includes at least one electrical contact as many as the at least one lane. The management unit is configured to receive lane information regarding the at least one lane of the optical transceiver from the optical transceiver through the connector and specify the at least one electrical contact that is available. The communication unit is configured to communicate with the optical transceiver through the connector. The communication unit is configured to communicate information with the optical transceiver through the at least one electrical contact specified by the management unit.

According to the above, a host board for optical communications can be provided that can incrementally change transmission capacity. The management unit specifies an available electrical contact of a connector based on the lane information from the optical transceiver. The transmission capacity can be changed by changing the number of lanes.

The number of lanes can be changed by specifying an available electrical contact. Consequently, the transmission capacity can be incrementally changed.

(2) Preferably, the lane information includes at least one of information indicating whether each of the at least one lane is implemented and information regarding a wavelength of an optical signal transmitted through the at least one lane.

According to the above, the management unit can determine the number of lanes. Further, the management unit can recognize a combination of lanes capable of wavelength multiplexing, not time division multiplexing on the same optical fiber, based on, for example, information regarding wavelengths.

(3) Preferably, the lane information includes information regarding a transmission capacity of the optical transceiver. The management unit is configured to determine the number of the lanes based on the information regarding the transmission capacity to specify the at least one electrical contact that is available.

According to the above, the management unit can specify an available electrical contact from the information on the transmission capacity supported by the optical transceiver.

(4) Preferably, the connector includes the at least one electrical contacts as many as four of the lanes.

According to the above, for example, parallel transmission by four lanes is enabled. In one example, a transmission capacity of 40 Gbps (10 G×4) or 100 Gbps (25 G×4) is enabled.

(5) Preferably, the at least one lane includes a first lane for a first transmission capacity of the optical transceiver and a second lane for a second transmission capacity of the optical transceiver. The second transmission capacity differs from the first transmission capacity.

According to the above, the optical transceiver that can achieve both the first transmission capacity and the second transmission capacity is connected to the host board. This allows coexistence of a previous generation system having low transmission capacity and a new generation system having high transmission capacity.

(6) Preferably, the management unit is configured to detect connection of the optical transceiver to the connector and read the lane information from the optical transceiver.

According to the above, plug-in to the host board by the optical transceiver can change the number of lanes, easily changing transmission capacity.

(7) An optical receiver according to an aspect of the present invention includes a wavelength demultiplexing unit, at least one optical reception unit, an interface, and a communication unit. The wavelength demultiplexing unit is configured to demultiplex at least one optical signal to be received from an optical signal transmitted through an optical fiber and subjected to wavelength multiplexing. The at least one optical reception unit is configured to receive the at least one optical signal to be received and output an electric signal. The interface includes an electrical contact for outputting the electric signal from the at least one optical reception unit to a host board. The communication unit is configured to notify the host board of information for specifying an electrical contact available for transmitting an electric signal from the at least one optical reception unit to the host board and the at least one optical receiver.

According to the above, an optical receiver for optical communications can be provided that can incrementally change transmission capacity. The host board can specify an electrical contact for receiving an electric signal from the optical receiver based on the information from the optical receiver. Further, even when receiving a wavelength multiplexed signal corresponding to a transmission capacity that is not supported, the optical receiver can ignore an optical signal with a wavelength irrelevant to data to be transmitted.

(8) Preferably, the information includes at least one of information indicating whether each of a plurality of lanes is implemented and information regarding a wavelength of an optical signal transmitted through the at least one lane.

According to the above, the optical receiver can provide the host board with information by which the number of lanes can be determined. Further, the optical receiver notifies the host board of the information regarding the wavelength of an optical signal, allowing the host board to recognize a combination of lanes capable of, for example, wavelength multiplexing, not time division multiplexing on the same optical fiber.

(9) Preferably, the plurality of lanes include a first lane for a first transmission capacity of the optical receiver and a second lane for a second transmission capacity of the optical receiver. The second transmission capacity differs from the first transmission capacity.

According to the above, an optical receiver that can achieve both the first transmission capacity and the second transmission capacity is connected to the host board. This allows coexistence of a previous generation system having low transmission capacity and a new generation system having high transmission capacity.

(10) Preferably, the information includes information regarding a transmission capacity of the optical receiver.

According to the above, the information regarding a transmission capacity supported by the optical receiver can be provided to the host board. Consequently, the host board can determine the number of lanes and specify an available electrical contact.

(11) An optical transmitter according to an aspect of the present invention includes at least one optical transmission unit, a wavelength multiplexing unit, an interface, and a communication unit. The at least one optical transmission unit is configured to receive an electric signal from a host board and transmit at least one optical signal having an identical wavelength or different wavelengths. The wavelength multiplexing unit is configured to transmit the at least one optical signal from the at least one optical transmission unit to an optical fiber, and when the at least one optical signal from the at least one optical transmission unit has different wavelengths, transmit an optical signal subjected to wavelength multiplexing to the optical fiber. The interface includes an electrical contact for receiving an electric signal from the host board. The communication unit is configured to notify the host board of information for specifying the electrical contact available for transmitting the electric signal from the host board to the at least one optical transmission unit and the at least one optical transmission unit.

According to the above, an optical transmitter for optical communications can be provided that can incrementally change transmission capacity. The host board can specify an electrical contact for receiving an electric signal from the host board based on the information from the optical transmitter.

(12) Preferably, the information includes at least one of information indicating whether each of a plurality of lanes is implemented and information regarding a wavelength of an optical signal transmitted through each of the lanes.

According to the above, the optical transmitter can provide the host board with information by which the number of lanes can be determined. Further, the optical transmitter notifies the host board of the information regarding the wavelength of an optical signal, allowing the host board to recognize a combination of lanes capable of, for example, wavelength multiplexing, not time division multiplexing on the same optical fiber.

(13) Preferably, the plurality of lanes include a first lane for a first transmission capacity of the optical transmitter, and a second lane for a second transmission capacity of the optical transmitter. The second transmission capacity differs from the first transmission capacity.

According to the above, the optical transmitter that can achieve both the first transmission capacity and the second transmission capacity is connected to the host board. This allows coexistence of a previous generation system having low transmission capacity and a new generation system having high transmission capacity.

(14) Preferably, the information includes information regarding a transmission capacity of the optical receiver.

According to the above, the information regarding a transmission capacity supported by the optical receiver can be provided to the host board. Consequently, the host board can determine the number of lanes and specify an available electrical contact.

(15) An optical transceiver according to an aspect of the present invention includes a wavelength demultiplexing unit, a wavelength multiplexing unit, at least one optical reception unit, at least one optical transmission unit, an interface, and a communication unit. The wavelength demultiplexing unit is configured to demultiplex at least one optical signal to be received from an optical signal transmitted through an optical fiber and subjected to wavelength multiplexing. The wavelength multiplexing unit is integral with the wavelength demultiplexing unit or separate from the wavelength demultiplexing unit. The at least one optical reception unit is configured to receive the at least one optical signal to be received. The at least one optical transmission unit is configured to receive an electric signal from a host board and output an optical signal. The interface has a first electrical contact for receiving an electric signal from the host board and a second electrical contact for outputting an electric signal from the at least one optical reception unit to the host board. The communication unit is configured to notify the host board of information for specifying the at least one optical reception unit, the at least one optical transmission unit, the first electrical contact available for transmitting the electric signal from the host board to the at least one optical transmission unit, and the second electrical contact available for transmitting the electric signal from the at least one optical reception unit to the host board.

According to the above, the optical transceiver for incrementally changing transmission capacity can be provided.

(16) A method of mounting an optical transceiver on a host board according to an aspect of the present invention includes connecting an optical transceiver storing lane information to a connector of a host board, reading the lane information from the optical transceiver, determining the number of lanes based on the lane information, and performing control for multi-lane distribution based on the number of lanes.

According to the above, the number of lanes can be determined every time the optical transceiver is connected to the connector. Consequently, transmission capacity can be incrementally changed.

(17) Preferably, the method further includes connecting another optical transceiver having a transmission capacity higher than that of the optical transceiver to the connector in place of the optical transceiver.

According to the above, the transmission capacity can be changed by exchanging an optical transceiver connected to the connector of the host board.

(18) Preferably, the method further includes connecting another optical transceiver to the connector in place of the optical transceiver. The other optical transceiver has a first transmission capacity identical to a transmission capacity of the optical transceiver and a second transmission capacity higher than the transmission capacity of the optical transceiver.

According to the above, the optical transceiver that can achieve both the first transmission capacity and the second transmission capacity is connected to the host board. This allows coexistence of a previous generation system having low transmission capacity and a new generation system having high transmission capacity.

(19) A host board according to an aspect of the present invention is a host board for mounting an optical transceiver, and includes a connector, a management unit, and a communication unit. The connector is configured to attach thereto and detach therefrom the optical transceiver having at least one lane. The management unit is configured to receive lane information regarding a lane available to the optical transceiver from the optical transceiver through the connector and specify the lane that is available. The communication unit is configured to communicate with the optical transceiver through the connector. The communication unit is configured to communicate data with the optical transceiver. The data is transmitted through the available lane specified by the management unit.

According to the above, a host board for optical communications can be provided that can incrementally change transmission capacity. The management unit specifies an available lane based on the lane information from the optical transceiver. The transmission capacity can be changed by changing the number of lanes. The number of lanes can be changed by specifying an available lane. Consequently, the transmission capacity can be incrementally changed.

(20) An optical receiver according to an aspect of the present invention includes a wavelength demultiplexing unit, at least one optical reception unit, an interface, and a communication unit. The wavelengthdemultiplexing unit is configured to demultiplex at least one optical signal to be received from an optical signal transmitted through an optical fiber and subjected to wavelength multiplexing. The at least one optical reception unit is configured to receive the at least one optical signal to be received and output an electric signal. The interface is provided for outputting an electric signal from the at least one optical reception unit to a host board. The communication unit is configured to notify the host board of information for specifying a lane available for transmitting an electric signal from the at least one optical reception unit to the host board and the at least one optical reception unit.

According to the above, an optical receiver for optical communications can be provided that can incrementally change transmission capacity. The host board can specify a lane available for receiving an electric signal from the optical receiver based on the information from the optical receiver. Further, even when receiving a wavelength multiplexed signal corresponding to a transmission capacity that is not supported, the optical receiver can ignore an optical signal with a wavelength irrelevant to data to be transmitted.

(21) An optical transmitter according to an aspect of the present invention includes at least one optical transmission unit, a wavelength multiplexing unit, an interface, and a communication unit. The at least one optical transmission unit is configured to receive an electric signal from a host board and transmit at least one optical signal having an identical wavelength or different wavelengths. The wavelength multiplexing unit is configured to transmit the at least one optical signal from the at least one optical transmission unit to an optical fiber, and when the at least one optical signal from the at least one optical transmission unit has different wavelengths, transmit an optical signal subjected to wavelength multiplexing to the optical fiber. The interface is provided for receiving an electric signal from the host board. The communication unit is configured to notify the host board of information for specifying a lane available for transmitting the electric signal from the host board to the at least one optical transmission unit and the at least one optical transmission unit.

According to the above, an optical transmitter for optical communications can be provided that can incrementally change transmission capacity. The host board can specify a lane available for receiving an electric signal from the optical transmission unit based on the information from the optical transmitter.

(22) An optical transceiver according to an aspect of the present invention includes a wavelength demultiplexing unit, a wavelength multiplexing unit, at least one optical reception unit, at least one optical transmission unit, an interface, and a communication unit. The wavelength demultiplexing unit is configured to demultiplex at least one optical signal to be received from an optical signal transmitted through an optical fiber and subjected to wavelength multiplexing. The wavelength multiplexing unit is integral with the wavelength demultiplexing unit or separate from the wavelength demultiplexing unit. The at least one optical reception unit is configured to receive the at least one optical signal to be received. The at least one optical transmission unit is configured to receive an electric signal from a host board and output an optical signal. The interface is provided for receiving an electric signal from the host board and outputting an electric signal from the at least one optical reception unit to the host board. The communication unit is configured to notify the host board of information for specifying the at least one optical reception unit, the at least one optical transmission unit, and a lane available for transmitting the electric signal from the host board to the at least one optical transmission unit and transmitting the electric signal from the at least one optical reception unit to the host board.

According to the above, an optical transceiver for enabling incremental change of transmission capacity can be provided.

Detailed Description of Embodiments

Embodiments of the present invention will be described hereinafter with reference to the drawings. The same or corresponding elements in the drawings have the same reference numerals allotted, and description thereof will not be repeated.

FIG. 1 shows an example configuration of an optical communication system according to an embodiment. In FIG. 1, a passive optical network (PON) system 300 is an optical communication system according to an embodiment. PON system 300 includes an optical line terminal (OLT) 301, optical network units (ONUs) 302, a PON line 303, and an optical splitter 304.

Optical line terminal 301 is placed in an office of a communication common carrier. Optical line terminal 301 has a host board (not shown) mounted therein. The host board is connected with an optical transceiver (not shown) that converts an electric signal and an optical signal to each other.

Optical network unit 302 is installed on the user side. Each of optical network units 302 is connected to optical line terminal 301 through PON line 303.

PON line 303 is an optical communication line composed of optical fibers. PON line 303 includes a trunk optical fiber 305 and at least one branch optical fiber 306. Optical splitter 304 is connected to trunk optical fiber 305 and branch optical fiber 306. Optical network units 302 can be connected to PON line 303.

An optical signal transmitted from optical line terminal 301 passes through PON line 303 and is branched to optical network units 302 by optical splitter 304. On the other hand, the respective optical signals transmitted from optical network units 302 are bundled by optical splitter 304 and pass through PON line 303 to be transmitted to optical line terminal 301. Optical splitter 304 passively branches or multiplexes signals input thereto, without requiring a specific external power supply.

PON system 300 is a point-to-multipoint (P2MP) system. The optical communication system according to an embodiment of the present invention may be a peer to peer (P2P) system.

As a high-rate PON system, a wavelength multiplexing PON system is studied which allocates a plurality of wavelengths to an upstream signal or a downstream signal and subjects the plurality of wavelengths to wavelength multiplexing to form an upstream signal or a downstream signal. For example, a 100 Gbps class PON can be configured to allocate a signal with a transmission capacity of 25 Gbps per wavelength to each of upstream and downstream and subject these wavelengths to wavelength multiplexing. As a scenario to introduce such a wavelength multiplexing PON system, incremental expansion (upgrade) of transmission capacity is conceivable. In the drawings described below, "Day 1", "Day 2", "Day 3", and the like each indicate a stage of transmission capacity expansion. Here, the name indicating a stage of transmission capacity expansion is not particularly limited. For example, a stage may be represented as "first generation" or "second generation" using the term "generation".

Embodiment 1

Figure 2:
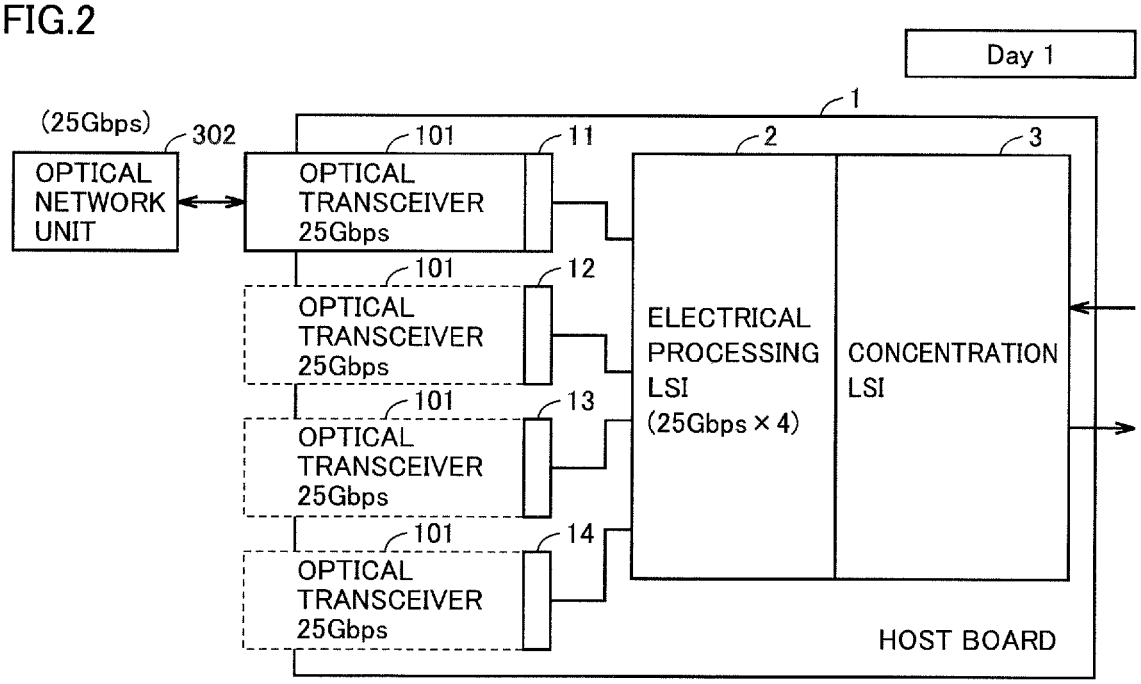
FIG. 2 shows a stage (Day 1) at which the transmission capacity is 25 Gbps in one scenario of transmission capacity expansion.
Figure 3:
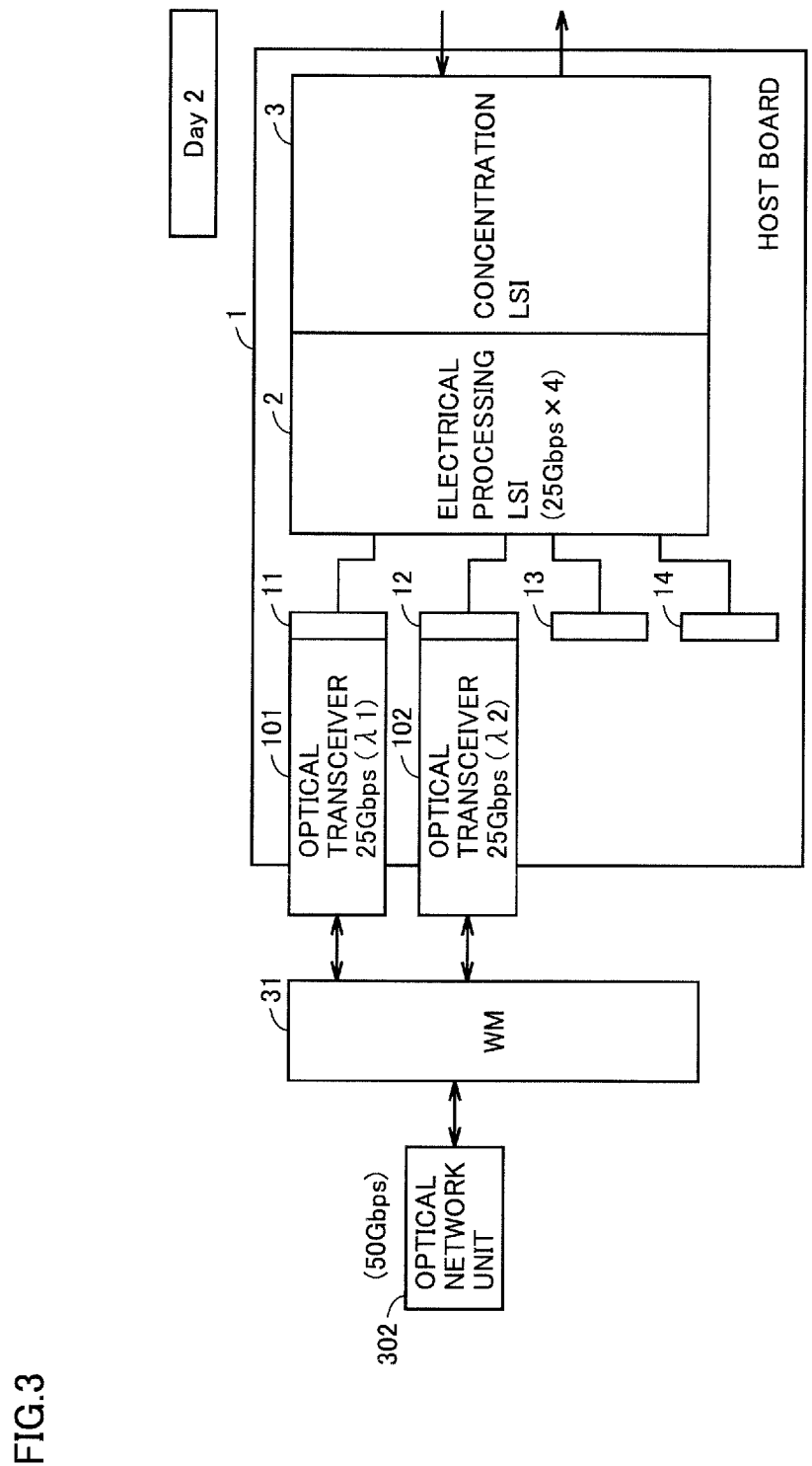
FIG. 3 shows a stage (Day 2) at which the transmission capacity has been expanded to 50 Gbps from the stage shown in FIG. 2.
Figure 4:
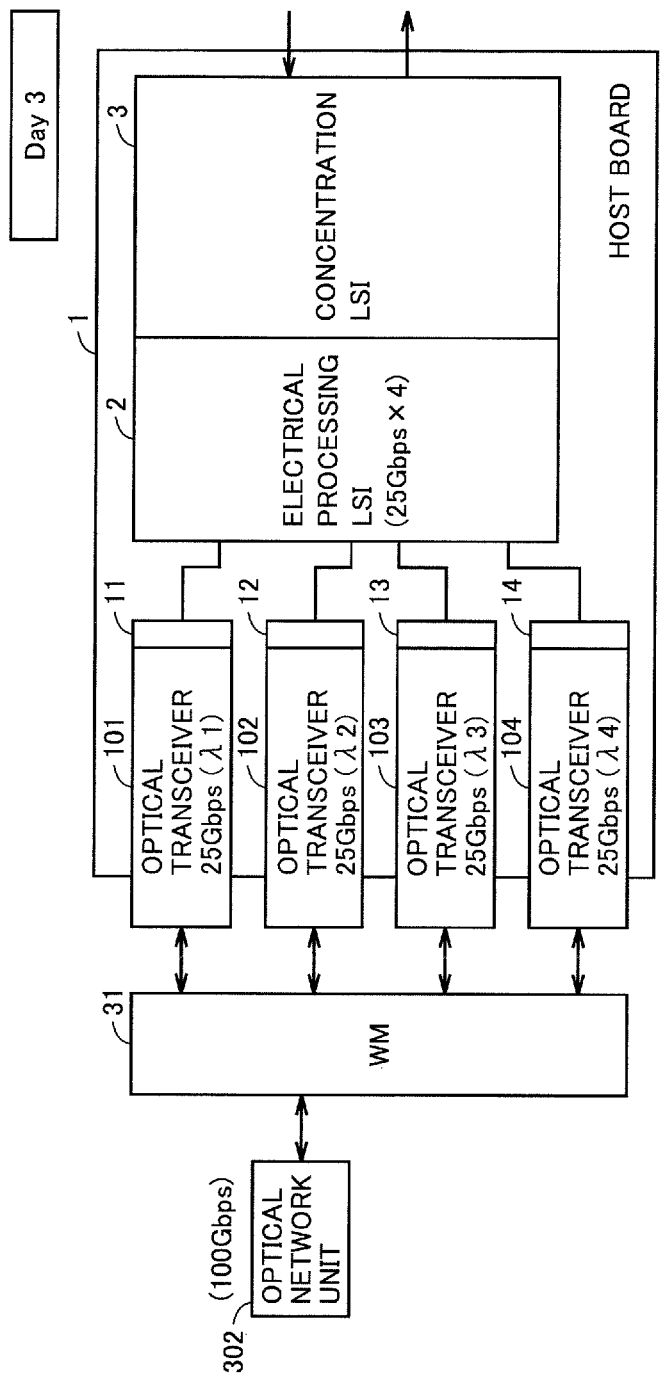
FIG. 4 shows a stage (Day 3) at which the transmission capacity has been expanded to 100 Gbps from the stage shown in FIG. 3.

As shown in FIGS. 2 to 4, one scenario of transmission capacity expansion is addition of an optical transceiver. With reference to FIG. 2, a host board 1 is mounted on optical line terminal 301 (see FIG. 1) and has ports 11 to 14, an electrical processing large scale integrated circuit (LSI) 2, and a concentration LSI 3. Each of ports 11 to 14 is configured to receive and output a signal and data from and to the optical transceiver. Each port is implemented by a connector.

Each of ports 11 to 14 is configured to be connected with an optical transceiver 101 for 25 Gbps. At the stage of "Day 1", optical transceiver 101 is connected only to port 11.

Electrical processing LSI 2 communicates information with host board 1 externally. Electrical processing LSI 2 performs various types of processing on an electric signal output from optical transceiver 101. Further, electrical processing LSI 2 receives an electric signal externally from host board 1 through concentration LSI 3 and generates an electric signal to be input to optical transceiver 101. Concentration LSI 3 accommodates a plurality of transmission lines for electric signals.

Electrical processing LSI 2 supports multi-lane distribution control. In one embodiment, electrical processing LSI 2 can achieve transmission of 100 Gbps by four 25 Gbps lanes. By changing the number of lanes, electrical processing LSI 2 supports transmission rates of 25 Gbps, 50 Gbps, and 100 Gbps.

Optical transceiver 101 receives an optical signal from optical network unit 302 and converts the optical signal into an electric signal. The electric signal is output from optical transceiver 101 through port 11 to electrical processing LSI 2. In contrast, optical transceiver 101 receives an electric signal from electrical processing LSI 2 through port 11 and converts the electric signal into an optical signal. The optical signal is transmitted from optical transceiver 101 through a PON line (see FIG. 1) to optical network unit 302.

FIG. 3 shows a stage (Day 2) at which the transmission capacity has been expanded to 50 Gbps from the stage shown in FIG. 2. With reference to FIGS. 2 and 3, at the stage of "Day 2", an optical transceiver 102 for 25 Gbps is mounted on host board 1 in addition to optical transceiver 101. Optical transceiver 102 is connected to port 12.

Optical transceiver 101 and optical transceiver 102 differ from each other in the wavelength of an optical signal. Optical wavelength multiplexer/demultiplexer (WM) 31 multiplexes an optical signal with a wavelength λ1 transmitted from optical transceiver 101 and an optical signal with a wavelength λ2 transmitted from optical transceiver 102. The optical signal subjected to wavelength multiplexing is transmitted to optical network unit 302. On the other hand, optical wavelength multiplexer/demultiplexer 31 demultiplexes an optical signal subjected to wavelength multiplexing transmitted from optical network unit 302 into two optical signals. Each of optical transceivers 101 and 102 receives a corresponding optical signal from optical wavelength multiplexer/demultiplexer 31.

FIG. 4 shows a stage (Day 3) at which the transmission capacity has been expanded to 100 Gbps from the stage shown in FIG. 3. With reference to FIGS. 3 and 4, at the stage of "Day 3", four optical transceivers (optical transceivers 101, 102, 103, 104) for 25 Gbps are mounted on host board 1. Optical transceivers 103 and 104 are connected to ports 13 and 14, respectively. Optical wavelength multiplexer/demultiplexer 31 multiplexes an optical signal with a wavelength λ3 transmitted from optical transceiver 103 and an optical signal with a wavelength λ4 transmitted from optical transceiver 104, in addition to the optical signals from optical transceivers 101 and 102. On the other hand, optical wavelength multiplexer/demultiplexer 31 demultiplexes an optical signal subjected to wavelength multiplexing, transmitted from optical network unit 302, into four optical signals. Each of optical transceivers 101 to 104 receives a corresponding optical signal from optical wavelength multiplexer/demultiplexer 31.

To implement the scenario shown in FIGS. 2 to 4, the following points need to be considered. First, a plurality of ports have to be mounted on host board 1 for expected future use. On the other hand, at the stage of Day 1, only one port is used and three ports are unused. At the stage of Day 1, however, the unused ports are wasted. Further, since the transmission capacity is expanded by the four ports prepared in Day 1, the transmission capacity per host board is small.

Second, in expanding the transmission capacity (during a shift from Day 1 to Day 2), optical wavelength multiplexer/demultiplexer 31 needs to be installed. This leads to a strong possibility that optical wavelength multiplexer/demultiplexer 31 may be installed separately from optical line terminal 301. However, securing the space for installing optical wavelength multiplexer/demultiplexer 31 may be difficult.

Third, in expanding the transmission capacity, an added optical transceiver and optical wavelength multiplexer/demultiplexer 31 need to be connected to each other by an optical fiber. Consequently, wiring of optical fibers tends to be complicated.

Figure 5:
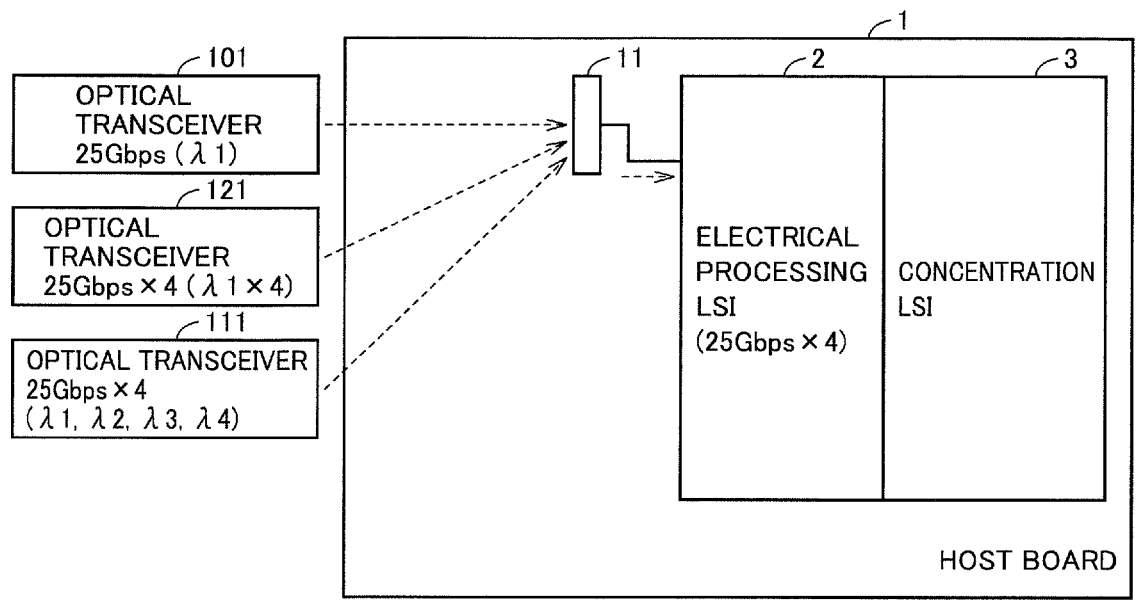
FIG. 5 shows a configuration of a host board according to an embodiment.

From the above points, Embodiment 1 can adopt the following scenario. FIG. 5 shows a configuration of a host board according to an embodiment. With reference to FIG. 5, host board 1 includes port 11, electrical processing LSI 2, and concentration LSI 3. Port 11 is configured to allow each of optical transceiver 101, optical transceiver 121, and optical transceiver 111 to be attached thereto and detached therefrom. Optical transceiver 121 has four channels with 25 Gbps and wavelength λ1. Optical transceiver 111 is an optical transceiver with 25 Gbps×4 wavelengths (λ1, λ2, λ3, λ4).

The optical transceiver according to an embodiment of the present invention is connected to port 11 to output, to electrical processing LSI 2, information regarding the transmission capacity supported by the optical transceiver. Electrical processing LSI 2 acquires the information through port 11. Used as a communication protocol between the optical transceiver and host board 1 is, for example, management data input/output (MDIO), serial peripheral interface (SPI), and serial communication such as I$^2$C.

Figure 6:
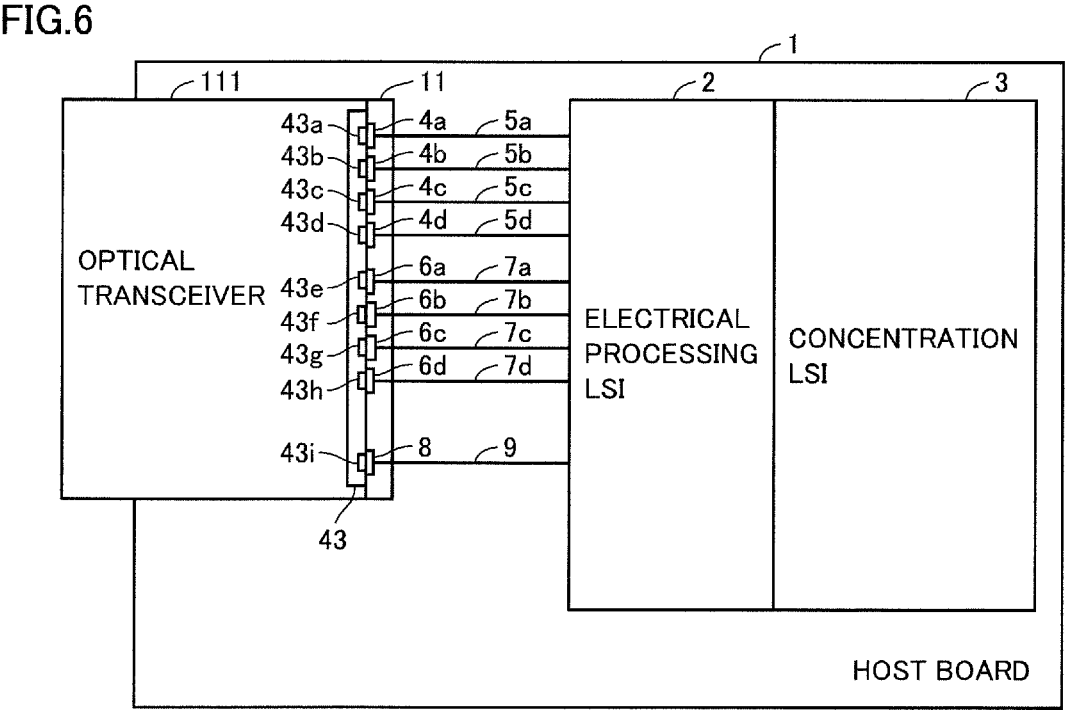
FIG. 6 schematically shows a configuration regarding the electric connection between an optical transceiver, a port 11, and an electrical processing LSI 2.

FIG. 6 schematically shows a configuration regarding the electric connection between the optical transceiver, port 11, and electrical processing LSI 2. In FIG. 6, an optical transceiver 111 is representatively shown as an optical transceiver connectable to port 11. Port 11 is implemented by a connector. The connector has electrical contacts 4a, 4b, 4c, 4d, 6a, 6b, 6c, 6d, and 8.

Electrical contacts 4a, 4b, 4c, and 4d are connected to high-rate signal lines 5a, 5b, 5c, and 5d, respectively. Electrical contacts 6a, 6b, 6c, and 6d are connected to high-rate signal lines 7a, 7b, 7c, and 7d, respectively. Electrical contact 8 is connected to a control signal line 9.

Optical transceiver 111 includes an electrical interface 43. Electrical interface 43 has pins 43a to 43i. With optical transceiver 111 connected to the connector (port 11), pins 43a to 43i are electrically connected to electrical contacts 4a to 4d, 6a to 6d, and 8, respectively. The pins of optical transceiver 111 may be arranged in accordance with, for example, centum gigabit form factor pluggable multi-source agreement (CFP MSA). In one embodiment, the optical transceiver may adhere to a standard referred to as CFP4.

High-rate signal lines 5a, 5b, 5c, 5d, 7a, 7b, 7c, and 7d, and control signal line 9 are connected to electrical processing LSI 2. High-rate signal lines 5a, 5b, 5c, and 5d form one pair, and high-rate signal lines 7a, 7b, 7c, and 7d form another pair. The high-rate signal lines of one of the two pairs are used for transmission of an electric signal from the optical transceiver connected to the connector (port 11) to electrical processing LSI 2. The high-rate signal lines of the other pair are used for transmission of an electric signal from electrical processing LSI 2 to the optical transceiver.

One signal line of each pair corresponds to one lane. Thus, for optical transceiver 101, one of high-rate signal lines 5a, 5b, 5c, and 5d and one of high-rate signal lines 7a, 7b, 7c, and 7d are used for transmission of an electric signal between electrical processing LSI 2 and optical transceiver 101. In FIG. 6, a line for signal transmission is indicated by one straight line. However, the line for signal transmission may be formed of a pair of differential signals (i.e., two lines).

Pins 43a to 43i of the optical transceiver include a pin (electrical contact) available for outputting an electric signal from an optical reception unit through the electrical contact of the connector to host board 1. Further, pins 43a to 43i of the optical transceiver include a pin that is available for transmitting an electric signal from electrical processing LSI 2 from the electrical contact of the connector and a pin for outputting information stored in the optical transceiver. Each pin is connected to a corresponding electrical contact of the connector (port 11).

An electric signal indicative of the information regarding transmission capacity is transmitted from optical transceiver 111 through control signal line 9 to electrical processing LSI 2. Electrical processing LSI 2 may transmit a signal for controlling an optical transceiver to the optical transceiver connected to port 11 (connector) through control signal line 9 or another signal line, which is not shown in FIG. 6.

Figure 7:
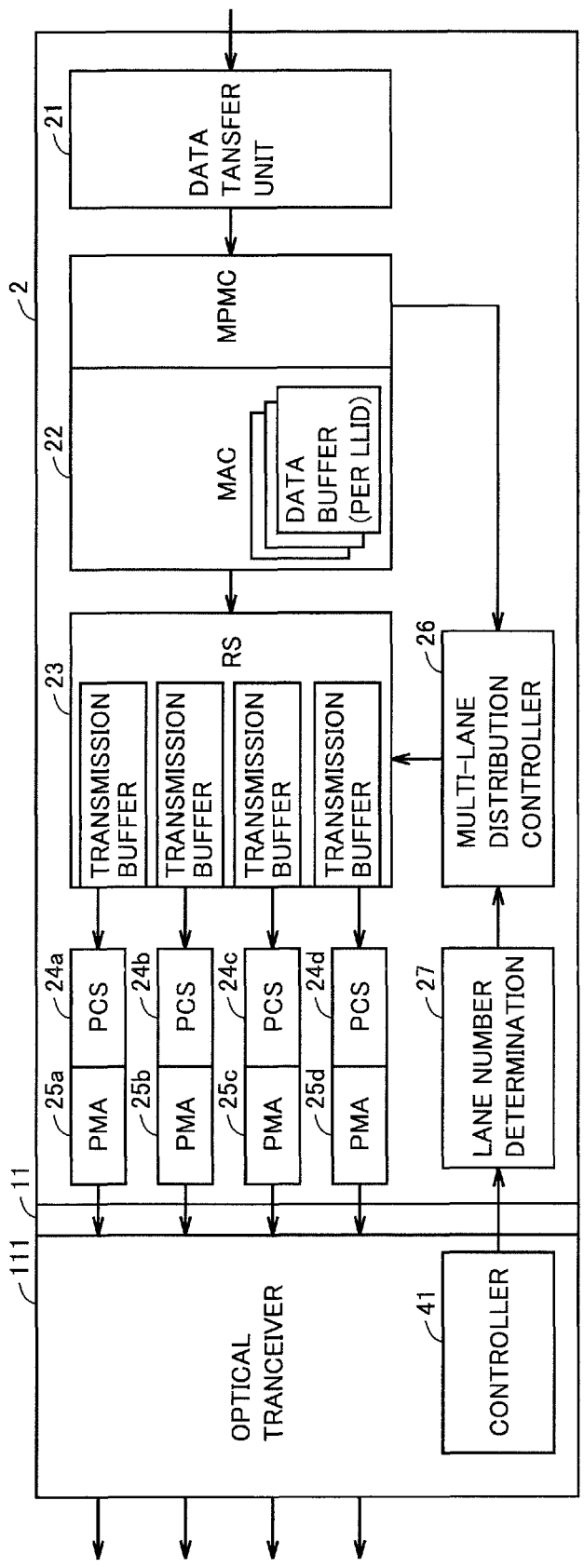
FIG. 7 is a block diagram showing a schematic configuration regarding downstream signal processing of electrical processing LSI 2.

FIG. 7 is a block diagram showing a schematic configuration regarding downstream signal processing of electrical processing LSI 2. With reference to FIG. 7, electrical processing LSI 2 includes a data transfer unit 21, a media access control (MAC) 22, a reconciliation sublayer (RS) 23, a physical coding sublayers (PCSs) 24a, 24b, 24c, and 24d, physical medium attachments (PMAs) 25a, 25b, 25c, and 25d, a multi-lane distribution controller 26, and a lane number determination unit 27.

Data transfer unit 21, MAC 22, RS 23, PCSs 24a to 24d, and PMAs 25a, 25b, 25c, and 25d communicate externally and implement a communication unit for communication with the optical transceiver through the connector. As shown in FIG. 6, electrical processing LSI 2 is electrically connected to the optical transceiver through the electrical contact of the connector (port 11).

Data transfer unit 21 performs processing such as processing of relaying a MAC frame, concentration processing of bundling traffic from MACs, or link aggregation for connection with a high-order device over a plurality of lines. MAC 22 provides a logical link identifier (LLID) indicative of a frame destination to an Ethernet (registered trademark) MAC frame and converts the MAC frame into a PON MAC frame. Then, MAC 22 stores data per LLID in a physical or logical data buffer provided per LLID.

Multi-lane distribution controller 26 instructs RS 23 to use which lane to transmit data block read amount from data buffer addressed to each LLID and a read data block, using information indicating to which lane the destination of each LLID is connected and lane information of the optical transceiver connected to the port, which are managed by a multi-point MAC control (MPMC) sublayer.

RS 23 reads data blocks from data buffer addressed to each LLID of MAC 22 in units of specific data length or in integral multiples thereof in accordance with the instruction of the multi-lane distribution controller, and provides an LLID indicative of a data destination and a sequence number indicative of a data configuration order. RS 23 divides the data blocks to transmission buffers provided per lane. "In units of specific data length" may be in units of code length of forward error correction (FEC) processed by PCS.

Each of PCSs 24a to 24d reads a data block from a transmission buffer provided per lane, adjusts a gap between MAC frames, performs 64B/66B encoding, and performs FEC encoding. Further, each of PMAs 25a to 25d performs parallel-serial conversion for interface with the optical transceiver.

On the other hand, received data of a plurality of lanes which has been transmitted from the optical transceiver is subjected to processing such as 64B/66B decoding, FEC decoding, and descrambling in a corresponding PCS of PCSs 24a to 24d, and is temporarily stored in a reception buffer (not shown). After the receipt of data blocks, in correspondence with an LLID (indicating from which ONU the data is transmitted) provided to the data block and the sequence number indicative of the data configuration order provided to the data block, MAC 22 divides the data blocks to the respective physical or logical data buffers addressed to the LLIDs, provided per LLID, and converts a PON MAC frame into an Ethernet (registered trademark) MAC frame. Data transfer unit 21 acquires data from the data buffers in the order of sequence numbers indicative of a data configuration order, and performs processing such as processing of relaying MAC frame, concentration processing of bundling traffic from MACs, and link aggregation for connection with a high-order device over a plurality of lines.

Multi-lane distribution controller 26 and lane number determination unit 27 implement a management unit on host board 1. The management unit receives lane information regarding an available lane of optical transceiver 111 from a controller 41 of optical transceiver 111 through the connector. The management unit specifies an electrical contact of a connector corresponding to the available lane, that is, an available electrical contact of the connector. Consequently, the transmission capacity can be incrementally upgraded.

Specifically, lane number determination unit 27 reads lane information regarding an available lane of optical transceiver 111 from controller 41 of optical transceiver 111. Lane number determination unit 27 determines the number of lanes of optical transceiver 111 based on the read information. When the lane information includes information on a wavelength used by each lane, lane number determination unit 27 can also have the function of determining the wavelength of each lane.

One or more corresponding PMAs of PMAs 25a to 25d transmit data to optical transceiver 111. As shown in FIG. 6, each of electrical contacts 4a to 4d and electrical contacts 6a to 6d of the connector is allocated to a corresponding one lane. Specifying an available lane specifies an available electrical contact associated with the lane from the electrical contacts. Consequently, a circuit block configuring a communication unit of electrical processing LSI 2 can communicate information (i.e., information transmitted from host board 1 by a downstream signal) with the optical transceiver via the specified electrical contact.

Optical transceiver 111 includes controller 41. Controller 41 monitors and controls optical transceiver 111. Further, controller 41 stores lane information regarding a lane and transmits the lane information to host board 1. A memory for storing lane information may be provided separately from controller 41 in optical transceiver 111.

In an optical transceiver described below, similarly, controller 41 notifies host board 1 of lane information regarding a lane. The lane information can be defined as information for specifying an electrical contact (a pin of the optical transceiver) for transmitting an electric signal output from the optical transceiver to host board 1 (electrical processing LSI 2). Further, the lane information can be defined as information for specifying an electrical contact of a connector for transmitting an electric signal output from host board 1 (electrical processing LSI 2) to the optical transceiver. Further, the lane information can include information for specifying an optical transmission unit for transmitting an optical signal or an optical reception unit for receiving an optical signal. This is because the optical transmission unit or the optical reception unit is associated with a lane.

FIG. 8 shows a first example of the lane information. With reference to FIG. 8, the lane information may include lane support information. The support information is information indicating the presence or absence of transmission and the presence or absence of reception for each of four lanes (Lane 1, Lane 2, Lane 3, Lane 4).

FIG. 9 shows a second example of the lane information. With reference to FIG. 9, the lane information may include lane wavelength information. The wavelength information indicates a wavelength for each lane of an optical signal transmitted and a wavelength for each lane of an optical signal received.

Optical transceiver 111 may have one of the lane support information shown in FIG. 8 and the lane wavelength information shown in FIG. 9. Alternatively, optical transceiver 111 may have both the lane support information and the lane wavelength information.

FIG. 10 shows an example configuration of the lane information stored in optical transceiver 111. With reference to FIG. 10, the lane information is, for example, information stored in a register of controller 41. For example, a transmitter lane and a receiver lane are each formed of 4 bits. Each bit indicates a number of a lane (Lane 0, Lane 1, Lane 2, Lane 3) and the presence or absence of implementation of the lane. The transmitter wavelength and the receiver wavelength are each formed of 2 bits×4=8 bits. Two bits of each wavelength indicates a number of a lane and a wavelength of an optical signal in the lane.

FIG. 11 shows a third example of the lane information. With reference to FIG. 11, controller 41 stores information on a transmission capacity supported by an optical transceiver. FIG. 11 shows, as an example, a transmission capacity (25 G, 50 G, or 100 G) in transmission and a transmission capacity (25 G, 50 G, or 100 G) in reception. Electrical processing LSI 2 may have information for associating a transmission capacity and the number of lanes to each other, and information regarding a wavelength of an optical signal (transmission and reception) of each lane. Electrical processing LSI 2 may acquire support information on a transmission capacity from controller 41 and expand the support information to the lane information.

The format of the information regarding a lane is not limited as shown in FIGS. 8 to 11. Returning back to FIG. 6, it suffices that host board 1 has electrical contact 8 for receiving information regarding a lane from the optical transceiver. For example, the information regarding the number of lanes may be assigned to pins (not shown) of the optical transceiver in contact with electrical contact 8. Electrical processing LSI 2 receives a signal output from electrical contact 8 through control signal line 9. This allows electrical processing LSI 2 to acquire the information regarding the number of lanes from the optical transceiver.

Figure 12:
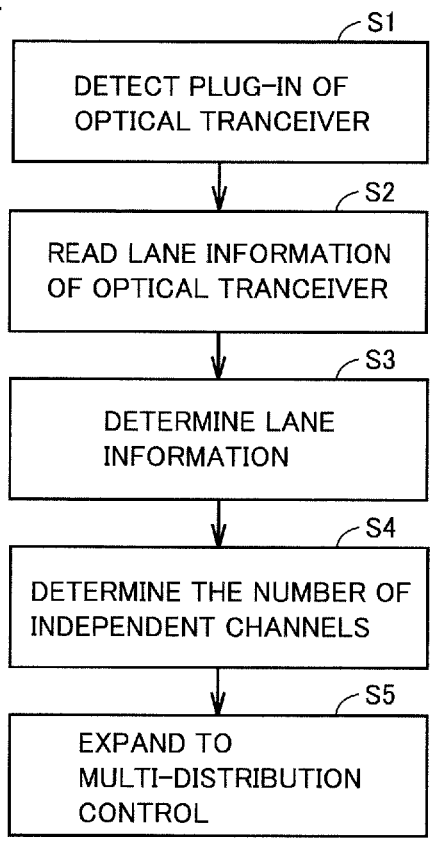
FIG. 12 is a flowchart showing a flow of multi-lane distribution control by the electrical processing LSI shown in FIG. 7.

FIG. 12 is a flowchart showing a flow of multi-lane distribution control by electrical processing LSI 2 shown in FIG. 7. With reference to FIGS. 7 and 12, in step S1, an optical transceiver (e.g., optical transceiver 111) is connected to port 11 of host board 1. Electrical processing LSI 2 receives a signal from a specific pin (e.g., MOD_ABS) of the pins assigned to the optical transceiver and detects plug-in to host board 1 by the optical transceiver. For example, plug-in to host board 1 by the optical transceiver may be detected by the state of this signal changing from high to low.

In step S2, electrical processing LSI 2 reads lane information from optical transceiver 111.

In step S3, lane number determination unit 27 of electrical processing LSI 2 determines lane information. In step S4, lane number determination unit 27 determines the number of independent channels based on the number of lanes included in the lane information and the wavelength information (see FIG. 10).

For example, if the number of lanes is four and the wavelength information in each lane is (λ0, 0, 0, 0), lane number determination unit 27 determines that the number of independent channels of 25 Gbps is four. Note that "λ0" correctively represents wavelengths λt0 and λr0 (the same applies to λ1, λ2, λ3 described below).

For example, if the number of lanes is four and the wavelength information in each lane is (λ0, λ1, λ2, λ3), lane number determination unit 27 determines that the number of independent channels of 100 Gbps is one.

For example, if the number of lanes is four and the wavelength information in each lane is (λ0, λ1, λ0, λ1), lane number determination unit 27 determines that the number of independent channels of 50 Gbps is two.

For example, if the number of lanes is two and the wavelength information in each lane is (λ0, λ1), lane number determination unit 27 determines that the number of independent channels of 50 Gbps is one.

In step S5, multi-lane distribution controller 26 expands the determination of the number of independent channels to multi-lane distribution control. Multi-lane distribution controller 26 distributes and passes transmission data to a lane configuring an independent channel.

Figure 13:
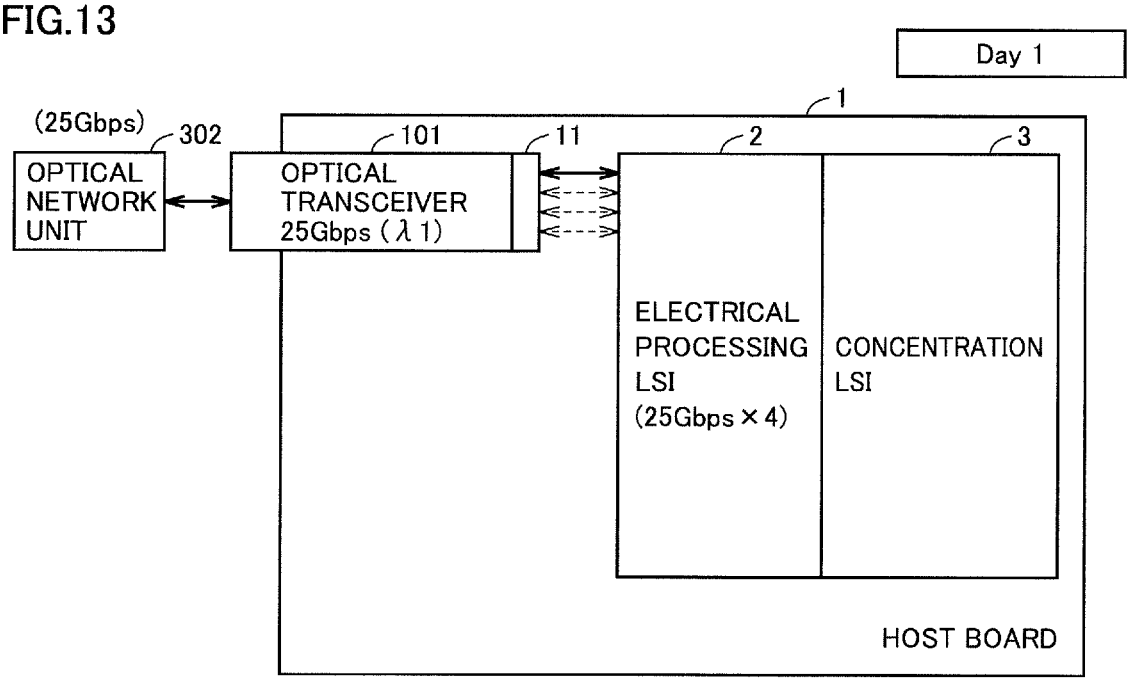
FIG. 13 shows a stage (Day 1) at which the transmission capacity is 25 Gbps in a scenario for achieving incremental upgrade of the transmission capacity according to Embodiment 1.

FIG. 13 shows a stage (Day 1) at which the transmission capacity is 25 Gbps in the scenario for implementing incremental upgrade of transmission capacity according to Embodiment 1. With reference to FIG. 13, optical transceiver 101 (25 Gbps, wavelength λ1) is connected to port 11 of host board 1. At this stage, the number of lanes is one, and the number of independent channels is one.

Figure 14:
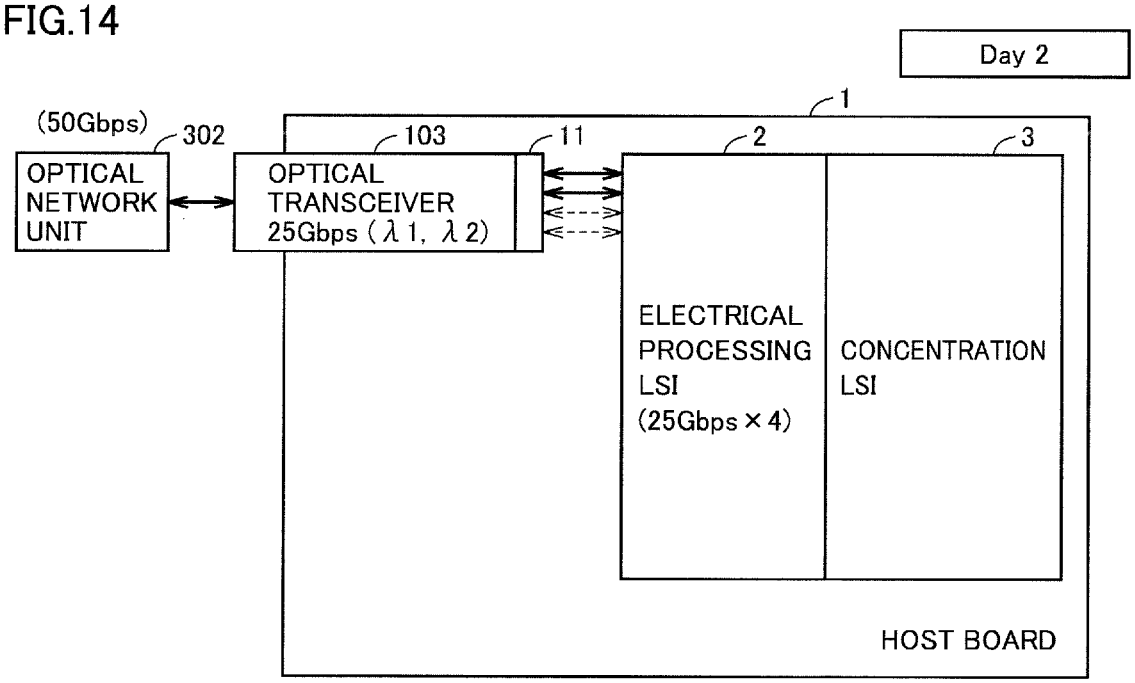
FIG. 14 shows a stage (Day 2) at which the transmission capacity has been expanded to 50 Gbps from the stage shown in FIG. 13.

FIG. 14 shows a stage (Day 2) at which the transmission capacity has been expanded to 50 Gbps from the stage shown in FIG. 13. With reference to FIG. 14, two-wavelength-integrated optical transceiver 103 (25 Gbps, wavelengths λ1, λ2) is connected to port 11. At this stage, the number of lanes is two, and the number of independent channels of 50 Gbps is one.

Figure 15:
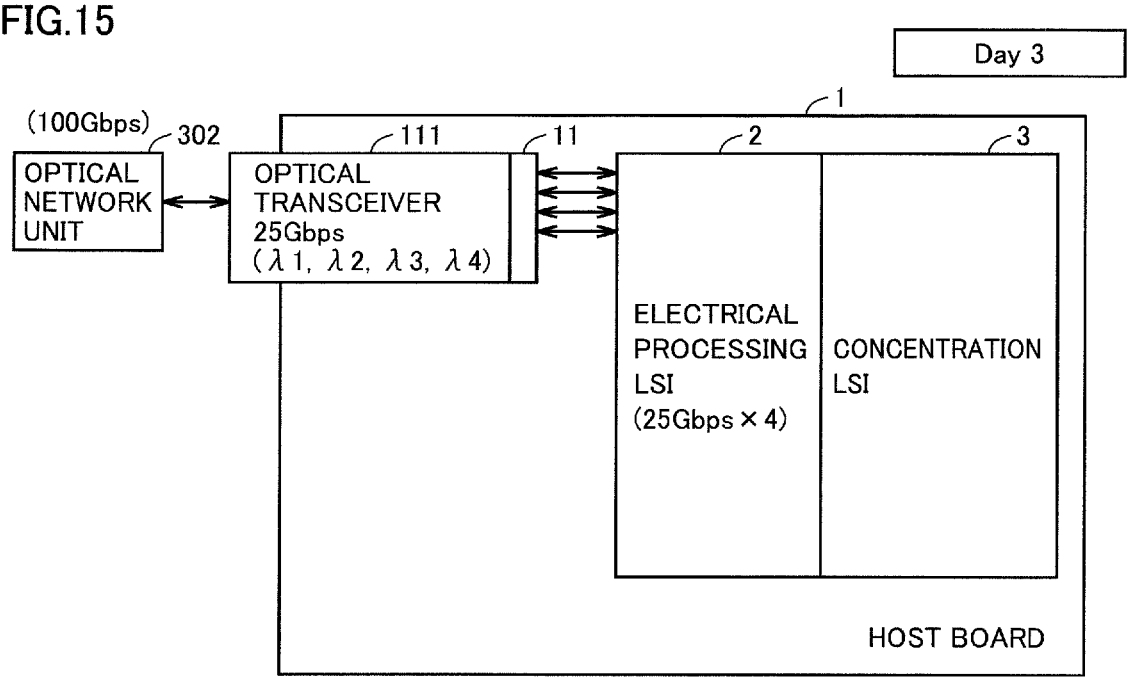
FIG. 15 shows a stage (Day 3) at which the transmission capacity is 100 Gbps in a scenario for achieving incremental upgrade of the transmission capacity according to Embodiment 1.

FIG. 15 shows a stage (Day 3) at which the transmission capacity is 100 Gbps in the scenario for implementing incremental upgrade of transmission capacity according to Embodiment 1. With reference to FIG. 15, a four-wavelength-integrated optical transceiver 111 (25 Gbps, wavelengths λ1, λ2, λ3, λ4) is connected to port 11 of host board 1. At this stage, the number of lanes is four, and the number of independent channels is one. A shift to the stage of Day 3 can be made following Day 1, and subsequently following Day 2.

Figure 16:
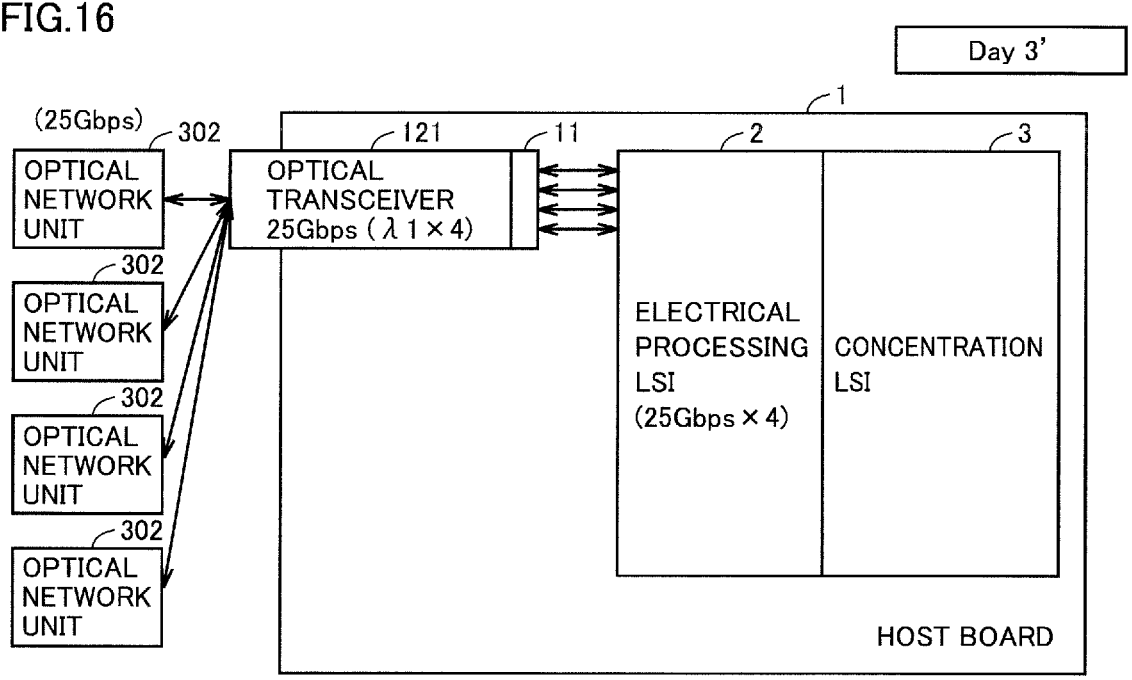
FIG. 16 shows a stage (Day 3') at which optical network units with a transmission capacity of 25 Gbps have been increased from the stage shown in FIG. 13.

FIG. 16 shows a stage (Day 3') at which optical network units having a transmission capacity of 25 Gbps have been increased from the stage shown in FIG. 13. With reference to FIG. 16, a band requested by a user is 25 Gbps. Optical transceiver 121 (25 Gbps, wavelength λ1×4) is connected to port 11. At this stage, the number of lanes is four, and the number of independent channels is four.

Normally, the integration of an electric circuit (LSI) is more advanced than the integration of an optical transceiver. In the scenario shown in FIGS. 13 to 16, host board 1 highly integrated is introduced from the first day (Day 1). Host board 1 has a configuration with high port density, which takes into account the stage of Day 3 from the beginning. The degree of integration of the optical transceiver connectable with port 11 is increased with higher integration of an optical transceiver. In the scenario shown in FIGS. 13 to 16, when a required transmission capacity (user requested band) is low, the power consumption or cost of an optical transceiver can be reduced. The optical transceiver connected to port 11 is exchanged with an optical transceiver having a higher degree of integration, thus increasing transmission capacity. This allows incremental upgrade of transmission capacity without the need for exchanging a host board. Further, according to the present embodiment, an empty port in Day 1 does not need to be mounted in a host board in advance.

Figure 17:
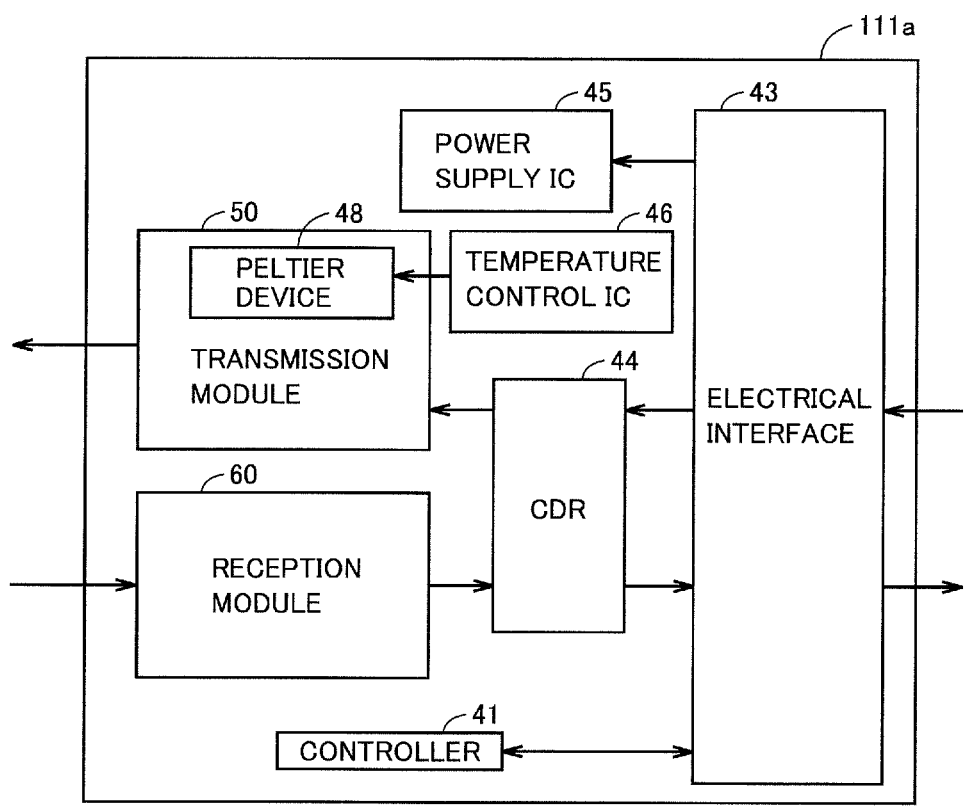
FIG. 17 shows a schematic configuration of an optical transceiver applicable to Embodiment 1.

FIG. 17 shows a schematic configuration of an optical transceiver applicable to Embodiment 1. FIG. 17 shows an optical transceiver 111*a* as an example. Optical transceiver 111*a* includes controller 41, electrical interface 43, a clock data recovery (CDR) IC 44, a power supply IC 45, a temperature control IC 46, a transmission module 50, and a reception module 60. Controller 41 monitors and controls optical transceiver 111*a*. Further, controller 41 stores lane information regarding a lane and transmits the lane information to host board 1. A memory for storing the lane information may be provided separately from controller 41 in optical transceiver 111*a*.

Electrical interface 43 receives and outputs an electric signal from and to electrical processing LSI 2. Transmission module 50 outputs data from clock data recovery IC 44 in the form of an optical signal. Transmission module 50 may include a Peltier device 48. Temperature control IC 46 sends a control signal to Peltier device 48 to control the temperature of transmission module 50.

Reception module 60 receives an optical signal and converts the optical signal into an electric signal. The electric signal from reception module 60 is transmitted to clock data recovery IC 44.

Clock data recovery IC 44 is not limited to one built in an optical transceiver and may be provided between the optical transceiver and electrical processing LSI 2 in host board 1. Alternatively, clock data recovery IC 44 may be built in electrical processing LSI 2.

Further, a clock data recovery IC on the transmission side and a clock data recovery IC on the reception side may be provided separately. The clock data recovery ICs may be provided between the optical transceiver and the host board or in the electrical processing LSI separately from each other.

The following will describe an example schematic configuration of an optical transceiver applicable to the scenario of incremental upgrade of transmission capacity. For easy understanding, the following figures mainly show the portions regarding the transmission and reception of an optical signal. Clock data recovery IC 44, power supply IC 45, temperature control IC 46, and Peltier device 48 are not shown in the figures described below.

Figure 18:
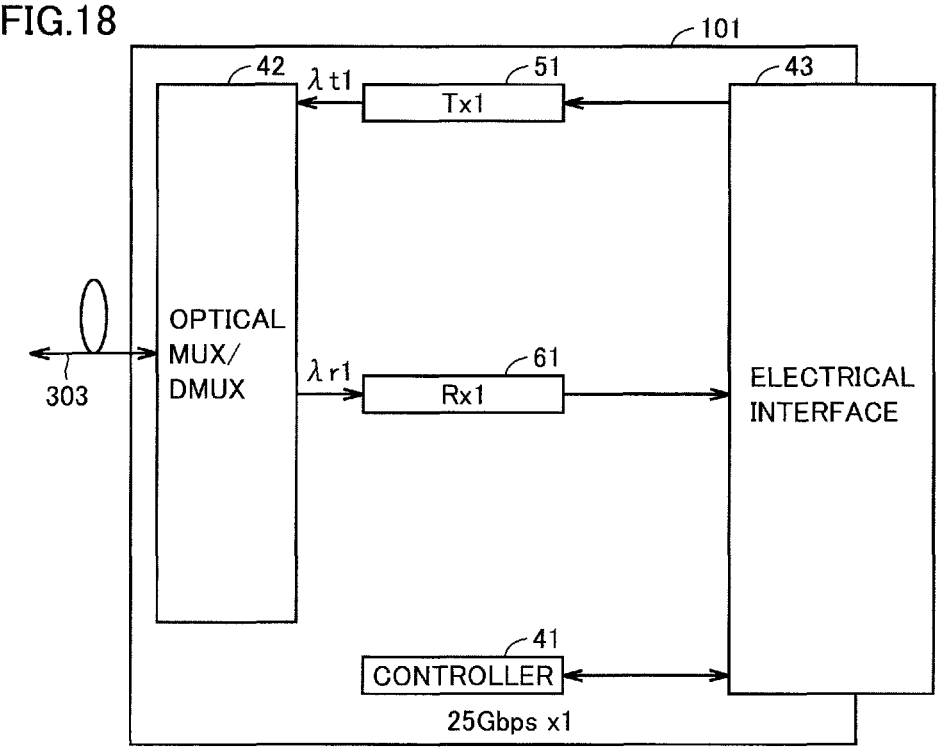
FIG. 18 shows an example configuration of an optical transceiver capable of incremental upgrade of transmission capacity.
Figure 19:
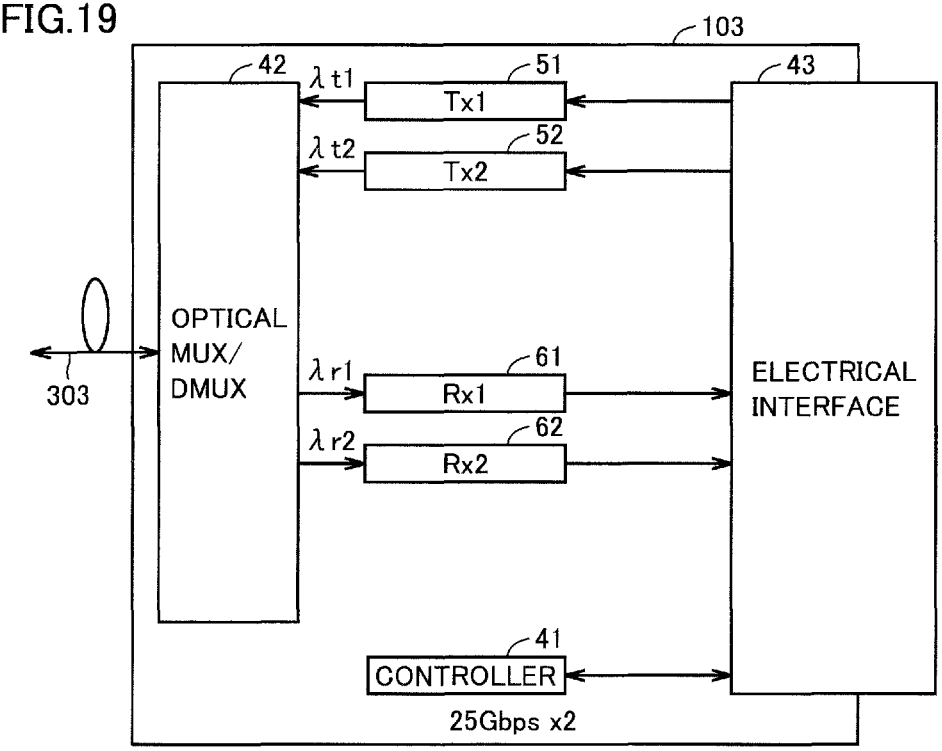
FIG. 19 shows an example configuration of an optical transceiver capable of incremental upgrade of transmission capacity.
Figure 20:
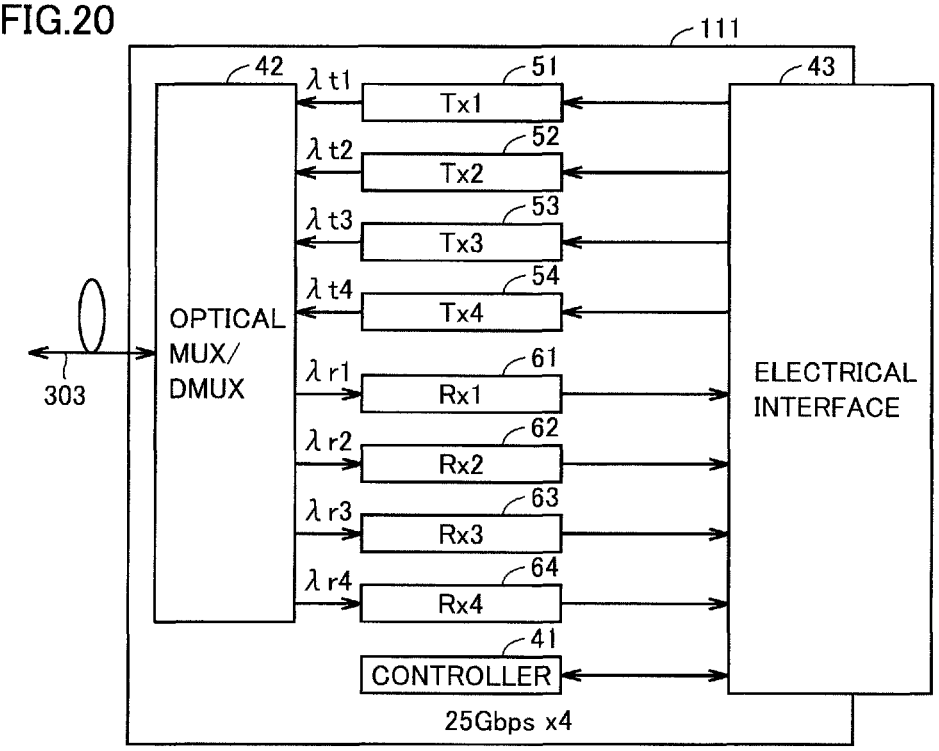
FIG. 20 shows an example configuration of an optical transceiver capable of incremental upgrade of transmission capacity.

FIGS. 18 to 20 show example configurations of a single-core bidirectional optical transceiver. FIG. 18 shows an example configuration of an optical transceiver capable of incremental upgrade of transmission capacity. With reference to FIG. 18, optical transceiver 101 supports a lane of 25 Gbps×1. Optical transceiver 101 includes controller 41, an optical wavelength multiplexer/demultiplexer (MUX/DMUX) 42, electrical interface 43, an optical transmission unit 51, and an optical reception unit 61.

Optical wavelength multiplexer/demultiplexer 42 is optically connected to PON line 303. Optical wavelength multiplexer/demultiplexer 42 is mounted on optical transceiver 101 to transmit a plurality of optical signals with different wavelengths over PON line 303. Specifically, optical wavelength multiplexer/demultiplexer 42 outputs an optical signal with a wavelength λt1 from optical transmission unit 51 to PON line 303 and outputs an optical signal with wavelength λr1 from PON line 303 to optical reception unit 61.

Optical transmission unit 51 receives an electric signal through electrical interface 43 and converts the electric signal into an optical signal with wavelength λt1. Optical transmission unit 51 outputs the optical signal to PON line 303 through optical wavelength multiplexer/demultiplexer 42.

Optical reception unit 61 receives the optical signal with wavelength λr1 from PON line 303 through optical wavelength multiplexer/demultiplexer 42 and converts the optical signal into an electric signal. Optical reception unit 61 outputs the electric signal to electrical interface 43.

FIG. 19 shows an example configuration of an optical transceiver capable of incremental upgrade of transmission capacity. As shown in FIG. 19, optical transceiver 103 supports 25 Gbps×2 lanes. Optical transceiver 103 can be used for achieving a transmission capacity of 50 Gbps.

Optical transceiver 103 includes an optical transmission unit 52 and an optical receiver 62 in addition to the configuration shown in FIG. 18. Optical transmission unit 52 receives an electric signal through electrical interface 43 and converts the electric signal into an optical signal with wavelength λt2. Optical receiver 62 receives an optical signal with wavelength λr2 from PON line 303 through optical wavelength multiplexer/demultiplexer 42 and converts the optical signal into an electric signal.

Optical wavelength multiplexer/demultiplexer 42 multiplexes an optical signal with wavelength λt1 transmitted from optical transmission unit 51 and an optical signal with wavelength λt2 transmitted from optical transmission unit 52 and outputs a wavelength multiplexed signal to PON line 303. On the other hand, optical wavelength multiplexer/demultiplexer 42 receives a wavelength multiplexed signal from PON line 303 and demultiplexes the wavelength multiplexed signal into two optical signals (wavelengths λr1, λr2).

FIG. 20 shows an example configuration of an optical transceiver capable of incremental upgrade of transmission capacity. As shown in FIG. 20, optical transceiver 111 supports 25 Gbps×4 lanes. Optical transceiver 111 can be used for achieving a transmission capacity of 100 Gbps.

Optical transceiver 111 includes optical transmission units 53 and 54 and optical reception units 63 and 64, in addition to the configuration shown in FIG. 19. Each of optical transmission units 53 and 54 receives an electric signal through electrical interface 43. Optical transmission units 53 and 54 output an optical signal with wavelength λt3 and an optical signal with wavelength λt4, respectively. Optical reception units 63 and 64 receive an optical signal with wavelength λr3 and an optical signal with wavelength λr4, respectively, from PON line 303 through optical wavelength multiplexer/demultiplexer 42. Each of optical reception units 63 and 64 converts the received optical signal into an electric signal.

Figure 21:
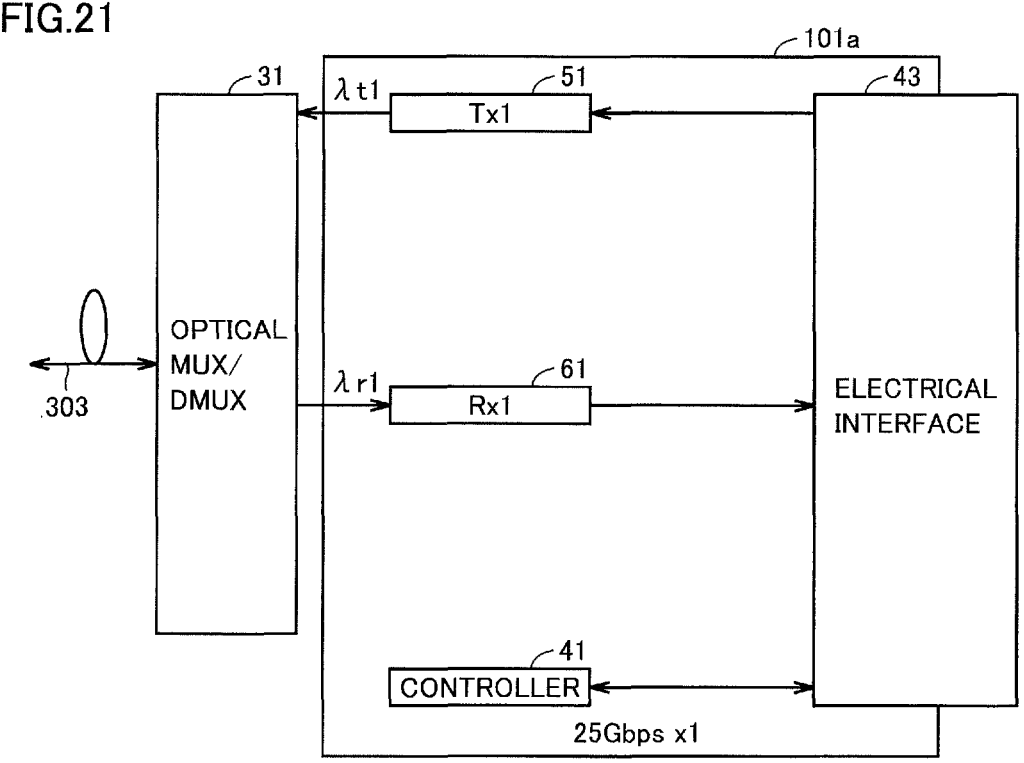
FIG. 21 shows an example configuration of an optical transceiver capable of incremental upgrade of transmission capacity.
Figure 22:
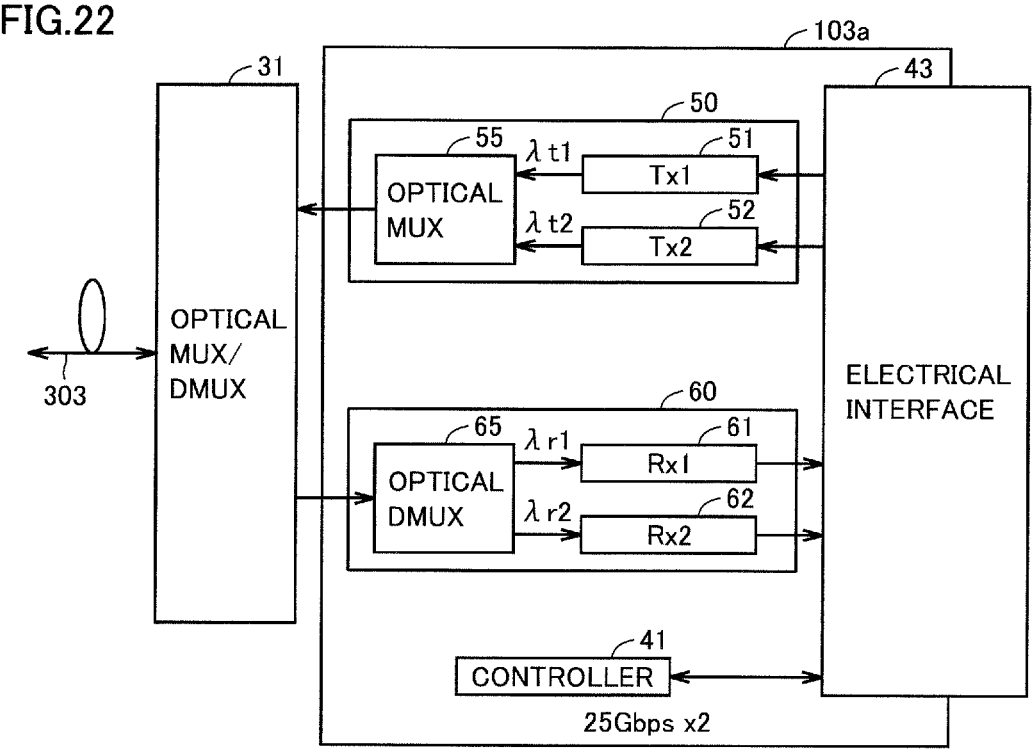
FIG. 22 shows an example configuration of an optical transceiver capable of incremental upgrade of transmission capacity.
Figure 23:
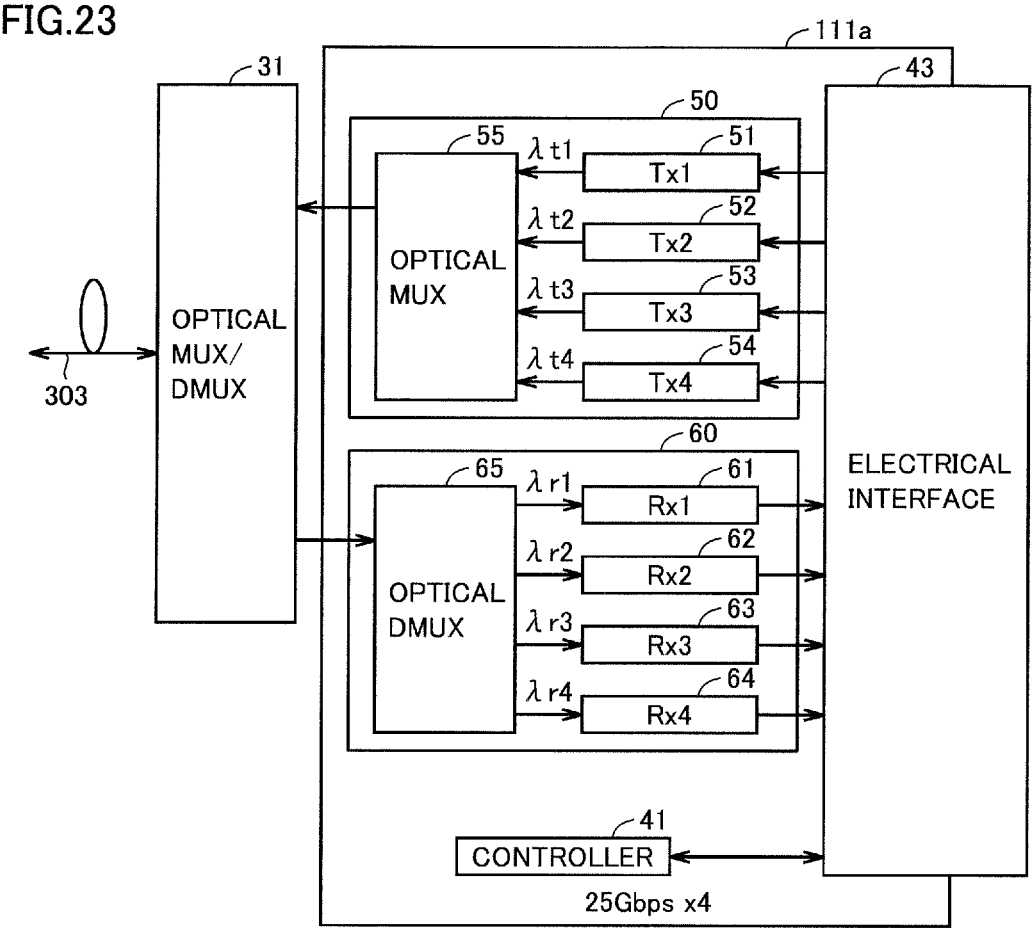
FIG. 23 shows an example configuration of an optical transceiver capable of incremental upgrade of transmission capacity.

FIGS. 21 to 23 show an example configuration of a dual-core optical transceiver. As shown in FIGS. 21 to 23, the optical wavelength multiplexer/demultiplexer is connected to an optical transceiver. With reference to FIGS. 18 and 21, an optical transceiver 101*a* differs from optical transceiver 101 in that it includes no optical wavelength multiplexer/demultiplexer. Similarly to optical transceiver 101, optical transceiver 101*a* can be used for achieving a transmission capacity of 25 Gbps.

With reference to FIG. 22, an optical transceiver 103a includes transmission module 50 and reception module 60. Similarly to optical transceiver 103, optical transceiver 103a can be used for achieving a transmission capacity of 50 Gbps.

Transmission module 50 includes optical transmission units 51 and 52 and an optical wavelength multiplexer (MUX) 55. Optical wavelength multiplexer 55 multiplexes optical signals from optical transmission units 51 and 52 to generate a wavelength multiplexed signal. The wavelength multiplexed signal is output to PON line 303 through optical wavelength multiplexer/demultiplexer 31.

Reception module 60 includes optical reception units 61 and 62 and an optical wavelength demultiplexer (DMUX) 65. Wavelength demultiplexer 65 receives a wavelength multiplexed signal from PON line 303 and demultiplexes the wavelength multiplexed signal into two optical signals (wavelengths $\lambda r1$, $\lambda r2$). Optical reception units 61 and 62 receive an optical signal with wavelength $\lambda r1$ and an optical signal with wavelength $\lambda r2$, respectively.

With reference to FIG. 23, optical transceiver 111a includes transmission module 50 and reception module 60. Similarly to optical transceiver 111, optical transceiver 111a can be used for achieving a transmission capacity of 100 Gbps.

Optical transceiver 111a differs from optical transceiver 103a in the configurations of transmission module 50 and reception module 60. Transmission module 50 includes optical transmission units 51, 52, 53, and 54, and reception module 60 includes optical reception units 61, 62, 63, and 64. The following will not repeat description of optical transmission units 51, 52, 53, and 54 and optical reception units 61, 62, 63, and 64.

Optical wavelength multiplexer 55 multiplexes optical signals from optical transmission units 51, 52, 53, and 54 to generate a wavelength multiplexed signal. Wavelength demultiplexer 65 receives a wavelength multiplexed signal from PON line 303 and demultiplexes the wavelength multiplexed signal into four optical signals (wavelengths $\lambda r1$, $\lambda r2$, $\lambda r3$, $\lambda r4$).

As described above, the wavelength of an optical signal received by each optical reception unit is determined in advance. For example, when optical transceiver 101 shown in FIG. 18 receives an optical signal subjected to wavelength multiplexing, optical wavelength multiplexer/demultiplexer 42 outputs only an optical signal with wavelength $\lambda r1$. In this manner, the optical transceiver according to Embodiment 1 converts an optical signal with a wavelength associated with a transmission capacity supported into an electric signal and outputs the electric signal to host board 1. The optical transceiver does not output optical signals with the other wavelengths to host board 1. In other words, the optical transceiver ignores optical signals with wavelengths other than reception objects.

In Embodiment 1, the shape of the optical transceiver is standardized to allow an optical transceiver for 25 G, an optical transceiver for 50 G, and an optical transceiver for 100 G to be connected to a connector on the host board 1 side. Exchanging an optical transceiver connected to a connector can allow incremental transmission capacity expansion.

Figure 24:
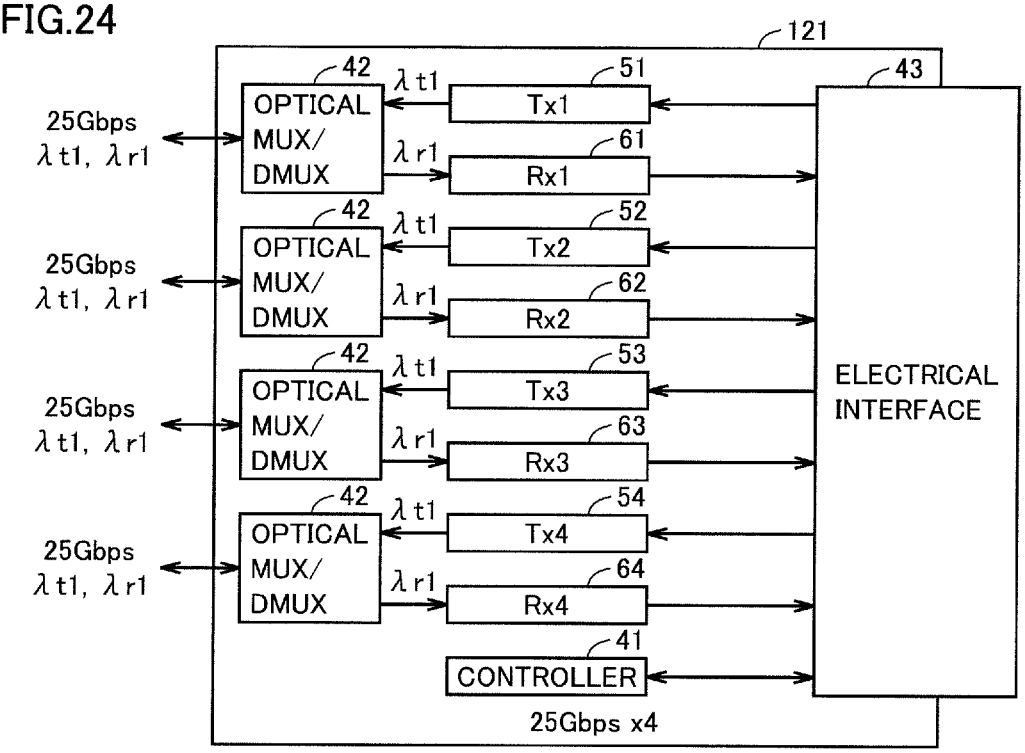
FIG. 24 shows another example configuration of an optical transceiver applicable to Embodiment 1.

FIG. 24 shows another example configuration of an optical transceiver applicable to Embodiment 1. As shown in FIG. 24, optical transceiver 121 includes four optical wavelength multiplexer/demultiplexers 42. Each of optical transmission units 51 to 54 transmits an optical signal with wavelength $\lambda t1$. Each of optical reception units 61 to 64 receives an optical signal with wavelength $\lambda r1$. Each optical wavelength multiplexer/demultiplexer 42 is connected to one optical transmission unit and one optical reception unit. Optical transceiver 121 supports 25 Gbps×4 lanes.

Figure 25:
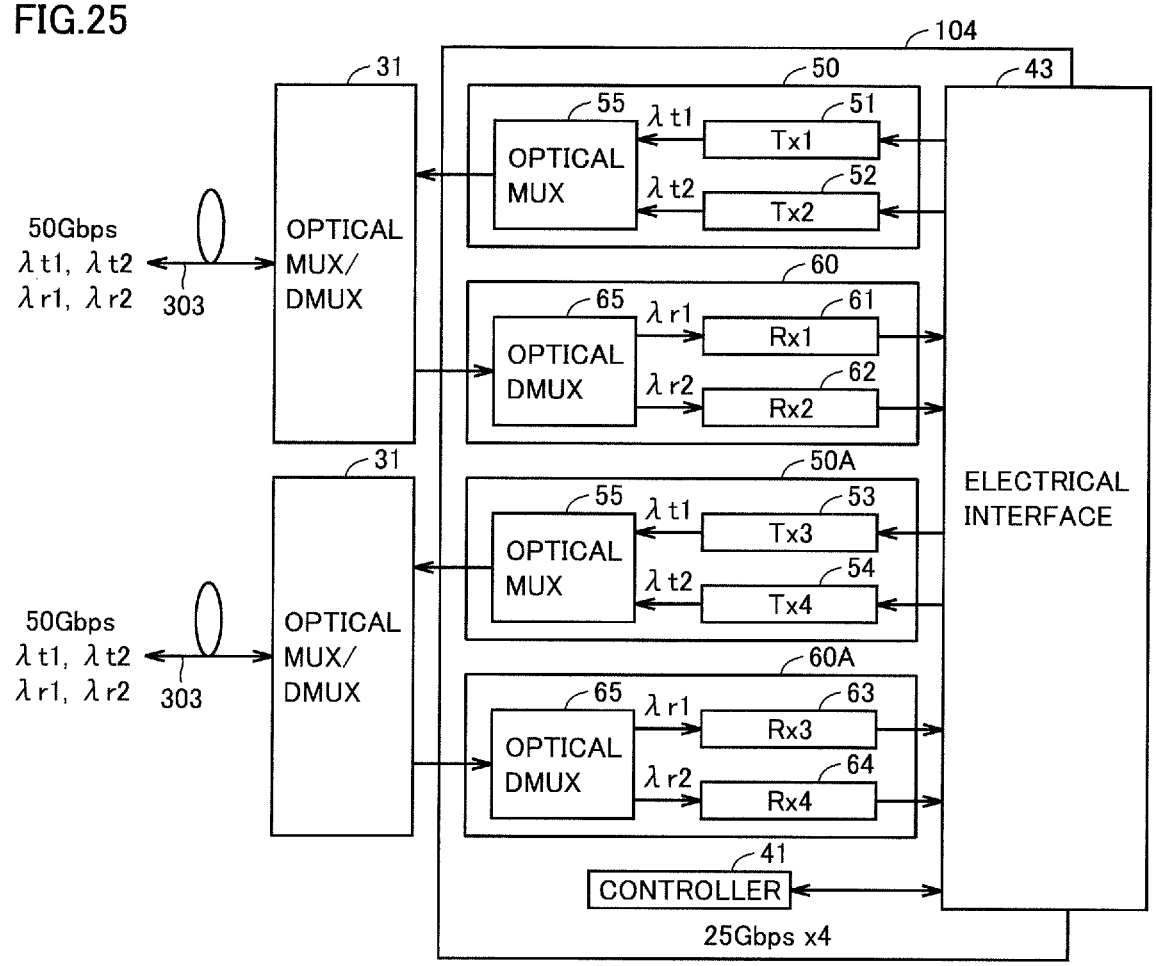
FIG. 25 shows another example configuration of an optical transceiver applicable to Embodiment 1.

FIG. 25 shows another example configuration of an optical transceiver applicable to Embodiment 1. As shown in FIG. 25, optical transceiver 104 includes transmission modules 50 and 50A and reception modules 60 and 60A. Transmission module 50A and reception module 60A have the same configurations as those of transmission module 50 and reception module 60. Thus, detailed descriptions of the configurations of transmission module 50A and reception module 60A will not be repeated. Optical transceiver 121 supports 25 Gbps×4 lanes.

Optical transceiver 104 is optically connected to two optical wavelength multiplexer/demultiplexers 31. Each optical wavelength multiplexer/demultiplexer 31 is connected to PON line 303. In the configuration shown in FIG. 25, the number of independent channels of 50 Gbps is two. Each of two PON lines 303 can achieve a transmission capacity of 50 Gbps.

Figure 26:
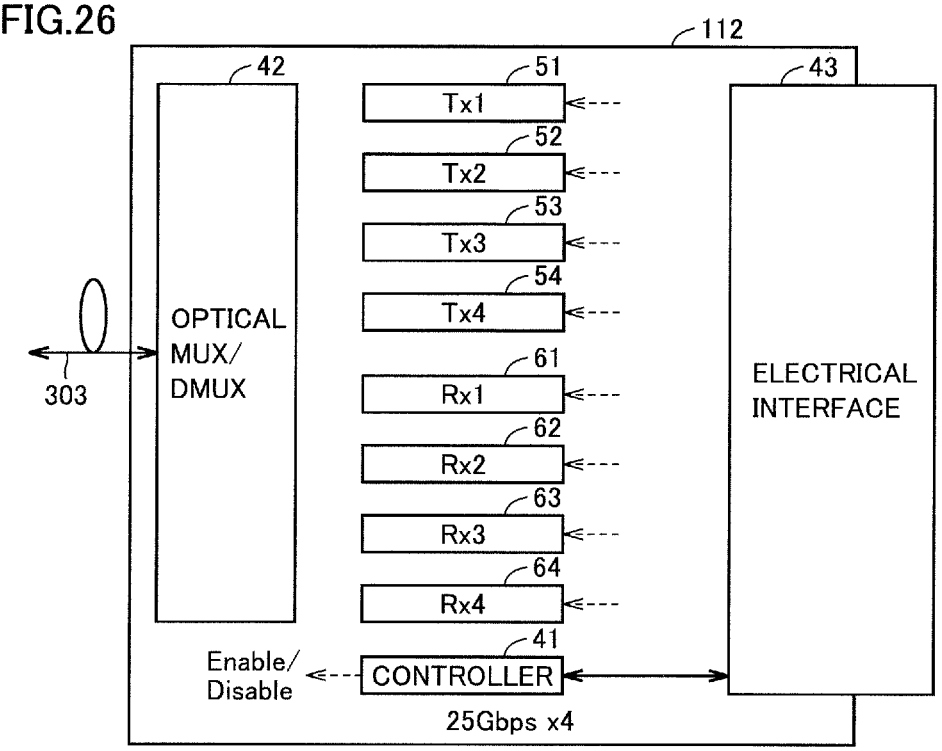
FIG. 26 shows another example configuration of an optical transceiver applicable to Embodiment 1.

FIG. 26 shows another example configuration of an optical transceiver applicable to Embodiment 1. As shown in FIG. 26, optical transceiver 112 has the same configuration as that of optical transceiver 111 (see FIG. 20). Controller 41 outputs an enable signal and a disable signal to each of optical transmission units 51 to 54 and optical reception units 61 to 64. Controller 41 may receive a signal externally from optical transceiver 112 through electrical interface 43 and output an enable signal and a disable signal in response to the signal. Each of optical transmission units 51 to 54 and optical reception units 61 to 64 is activated by an enable signal, whereas it is deactivated by a disable signal.

Figure 27:
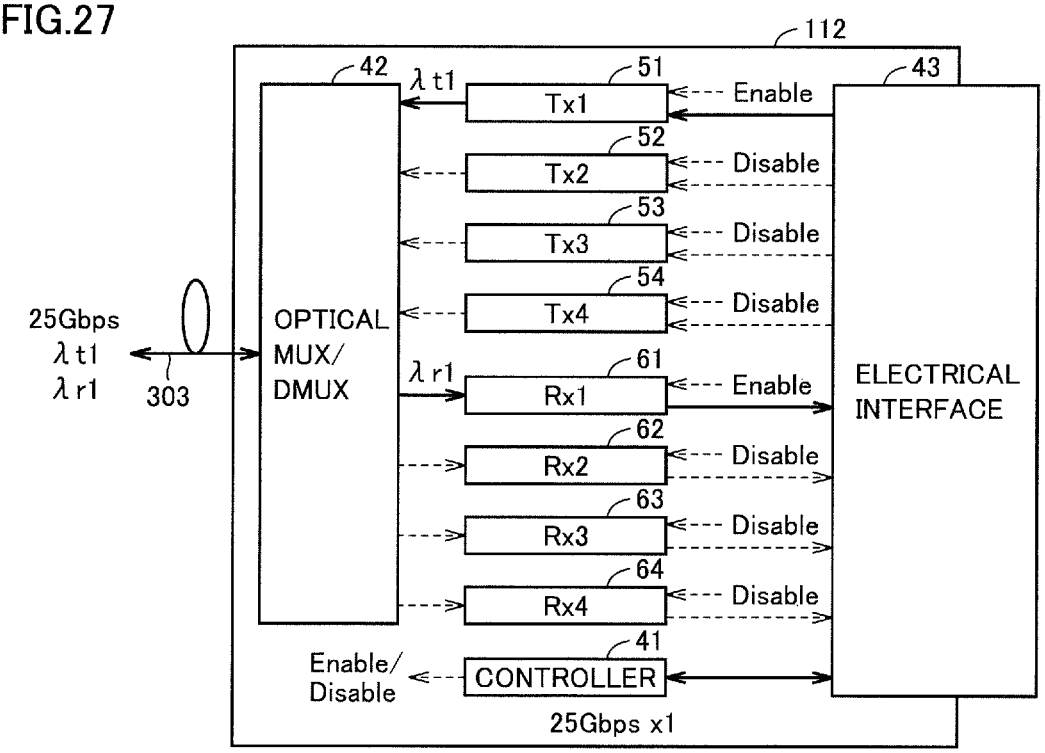
FIG. 27 shows a configuration for supporting 25 Gbps by the optical transceiver shown in FIG. 26.

FIG. 27 shows a configuration for supporting 25 Gbps by optical transceiver 112 shown in FIG. 26. As shown in FIG. 27, controller 41 transmits an enable signal to optical transmission unit 51 and optical reception unit 61 and transmits a disable signal to another optical transmission unit and another optical reception unit. Activation of optical transmission unit 51 and optical reception unit 61 achieves 25 Gbps×1 lane.

Figure 28:
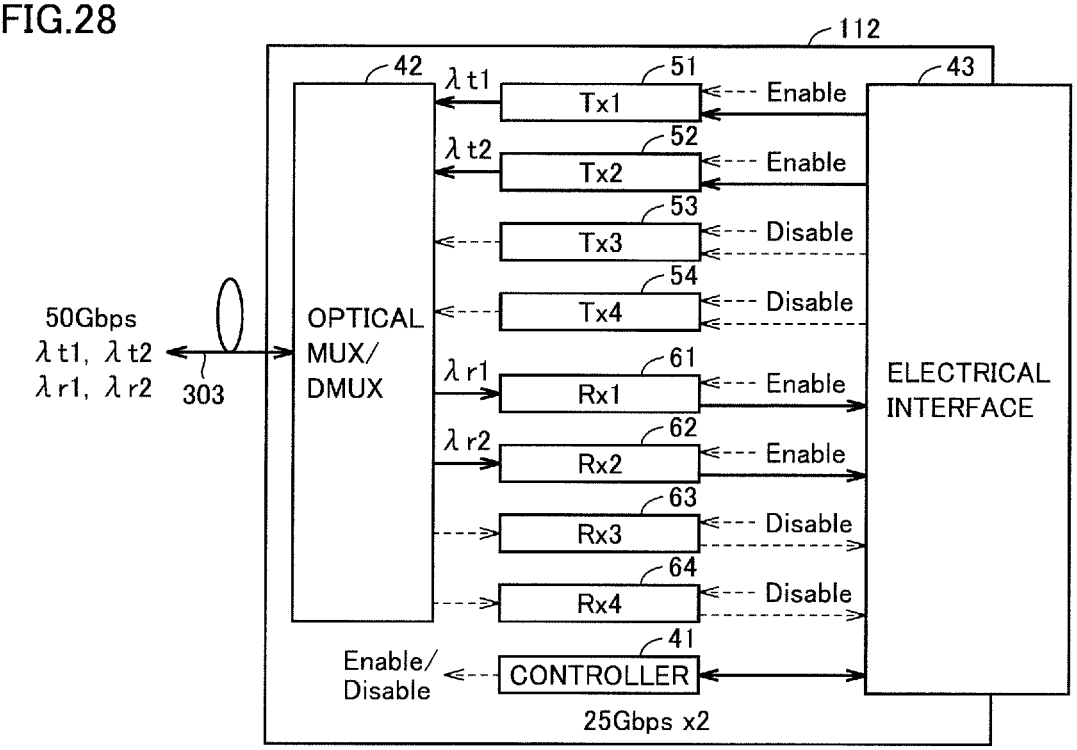
FIG. 28 shows a configuration for supporting 50 Gbps by the optical transceiver shown in FIG. 26.

FIG. 28 shows a configuration for supporting 50 Gbps by optical transceiver 112 shown in FIG. 26. As shown in FIG. 28, controller 41 transmits an enable signal to optical transmission units 51 and 52 and optical reception units 61 and 62 and transmits a disable signal to another optical transmission unit and another optical reception unit. Activation of optical transmission units 51 and 52 and optical reception units 61 and 62 can achieve 25 Gbps×2 lanes.

Figure 29:
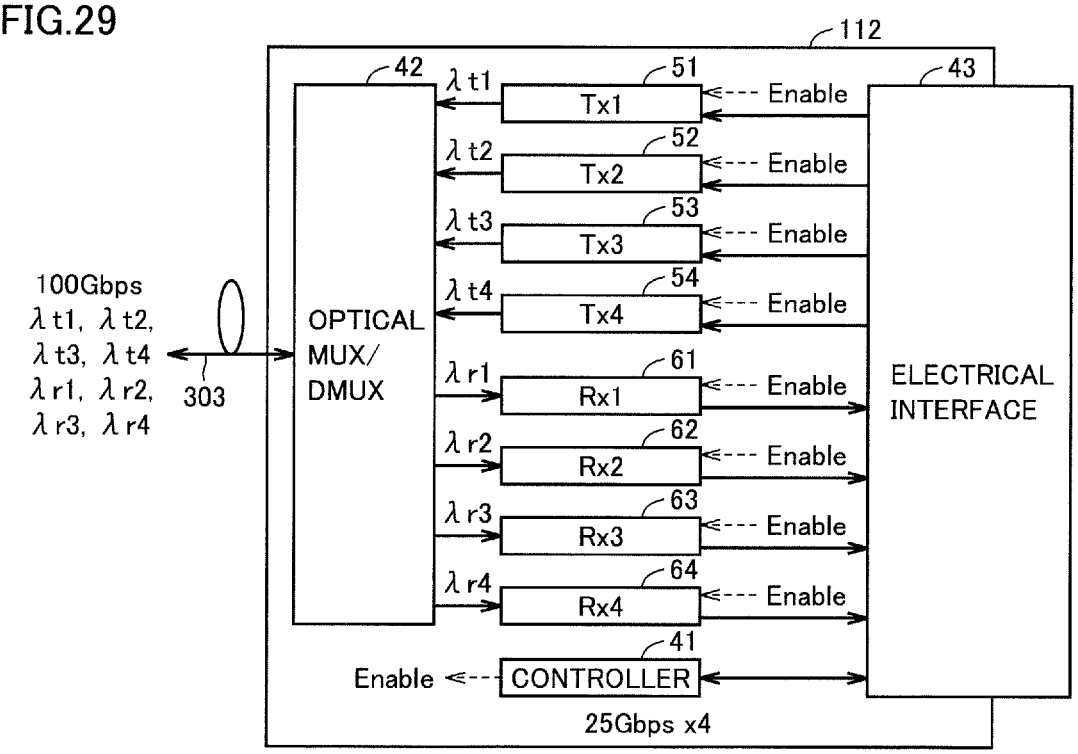
FIG. 29 shows a configuration for supporting 100 Gbps by the optical transceiver shown in FIG. 26.

FIG. 29 shows a configuration for supporting 100 Gbps by optical transceiver 112 shown in FIG. 26. As shown in FIG. 29, controller 41 transmits an enable signal to optical transmission units 51, 52, 53, and 54 and optical reception units 61, 62, 63, and 64. Activation of optical transmission units 51 to 54 and optical reception units 61 to 64 can achieve 25 Gbps×4 lanes.

Figure 30:
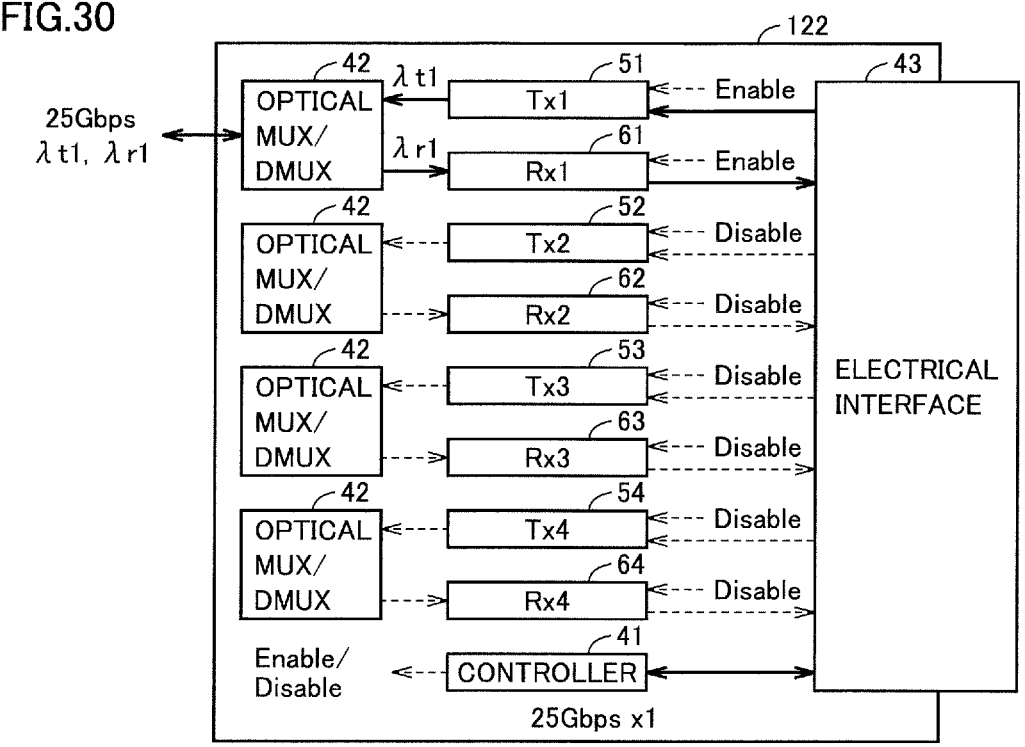
FIG. 30 shows another configuration example of an optical transceiver applicable to Embodiment 1.

FIG. 30 shows another example configuration of an optical transceiver applicable to Embodiment 1. As shown in FIG. 30, optical transceiver 122 has the same configuration as that of optical transceiver 121 (see FIG. 21). Controller 41 transmits an enable signal or a disable signal to each of optical transmission units 51 to 54 and optical reception units 61 to 64. In the example shown in FIG. 30, controller 41 transmits an enable signal to optical transmission unit 51 and optical reception unit 61 and transmits a disable signal to another optical transmission unit and another optical reception unit. Optical transmission unit 51 and optical reception unit 61 are activated. Thus, optical transceiver 121 is equivalent to optical transceiver 101 with one channel (wavelength λ1) of 25 Gbps.

Figure 31:
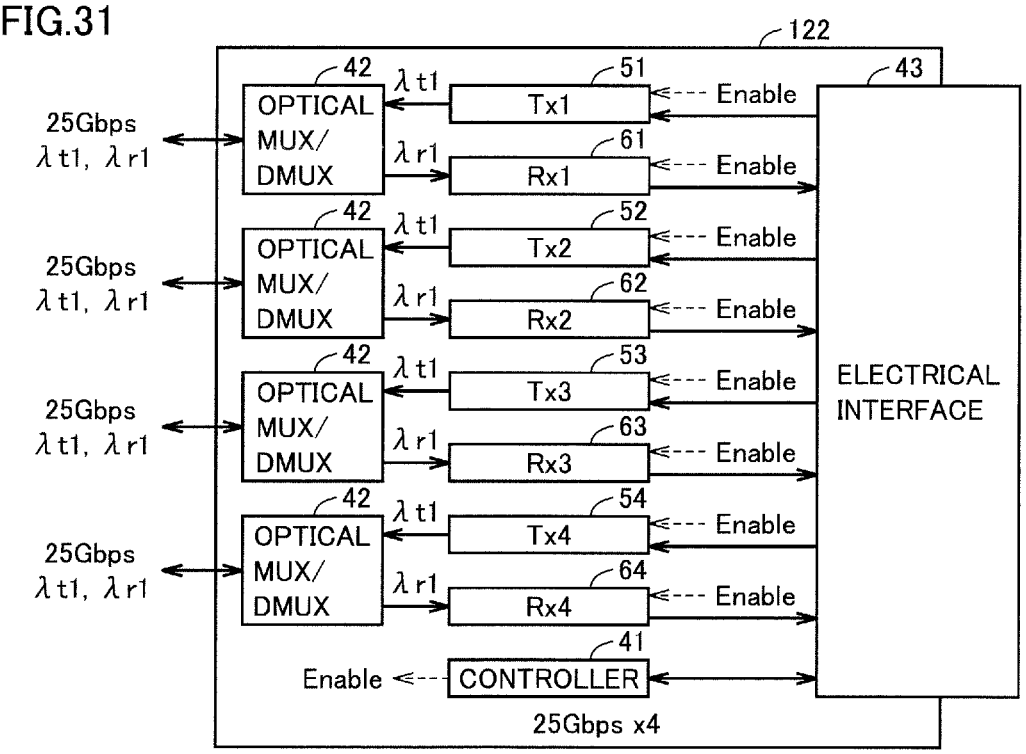
FIG. 31 shows an example configuration for supporting transmission of 25 Gbps×4 channels by the optical transceiver shown in FIG. 30.

FIG. 31 shows an example configuration for supporting the transmission of 25 Gbps×4 channels by optical transceiver 122 shown in FIG. 30. With reference to FIG. 31, controller 41 transmits an enable signal to optical transmission units 51 to 54 and optical reception units 61 to 64. This activates optical transmission units 51 to 54 and optical reception units 61 to 64.

In the configurations shown in FIGS. 26 to 31, controller 41 sends an enable/disable signal in optical transceivers 112 and 122. However, the host board 1 side (e.g., electrical processing LSI 2 or another control block on the host board) may directly supply an enable/disable signal to the optical transmission units and the optical reception units of optical transceivers 112 and 122 through a port (connector), not through controller 41.

Figure 32:
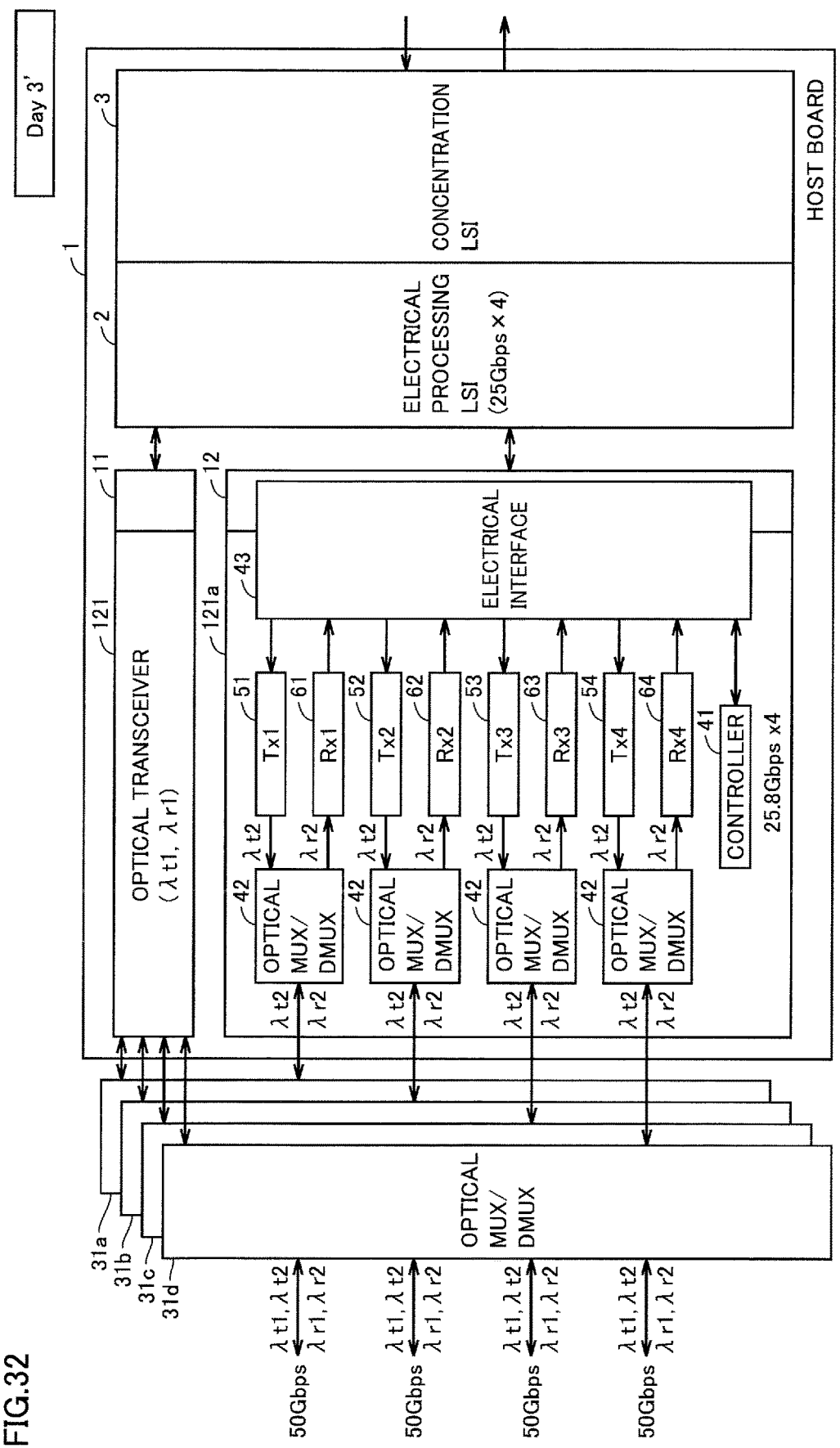
FIG. 32 shows another example of a scenario of incremental upgrade of transmission capacity.

FIG. 32 shows another example of a scenario of incremental upgrade of transmission capacity. With reference to FIG. 32, at the first stage, optical transceiver 121 is connected to port 11. Further, optical wavelength multiplexer/demultiplexers 31a, 31b, 31c, and 31d are optically connected to optical transceiver 121. This enables the transmission of an optical signal by 25 Gbps×4 channels.

At the second stage, optical transceiver 121a is connected to port 12 and is optically connected to optical wavelength multiplexer/demultiplexers 31a, 31b, 31c, and 31d. Optical transceiver 121a has the same configuration as that of optical transceiver 121 except for that the wavelength of an optical signal is λ2 (λt2, λr2). Optical wavelength multiplexer/demultiplexers 31a, 31b, 31c, and 31d subject optical signals from optical transceivers 121 and 121a to wavelength multiplexing and demultiplex a wavelength multiplexed signal from a PON line (not shown) into an optical signal with wavelength λr1 and an optical signal with wavelength λr2. This enables the transmission of optical signals by 50 Gbps×4 channels.

Figure 33:
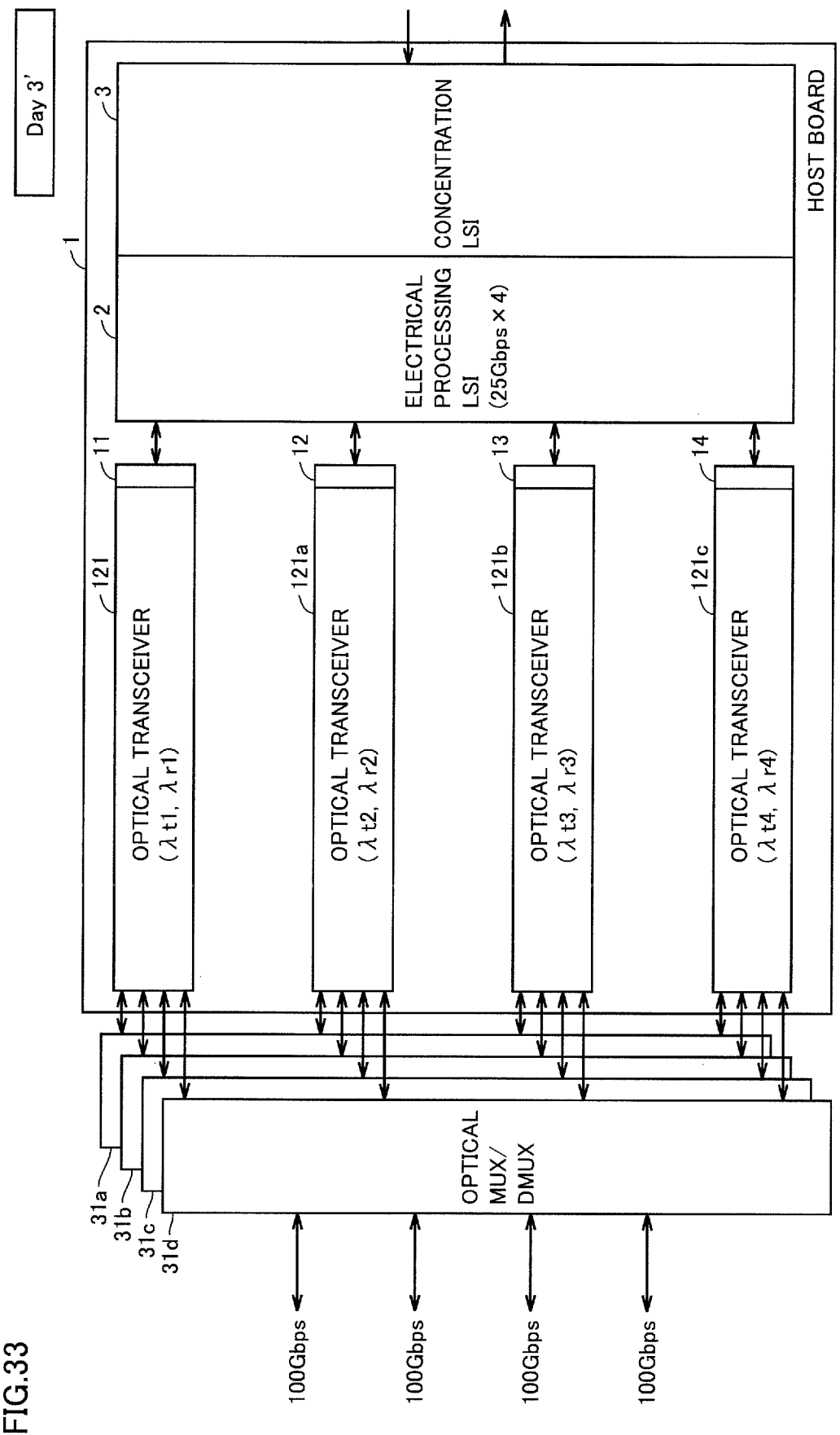
FIG. 33 shows a configuration for upgrading transmission capacity from the configuration shown in FIG. 32.

FIG. 33 shows a configuration for upgrading a transmission capacity from the configuration shown in FIG. 32. The configuration shown in FIG. 33 differs from the configuration shown in FIG. 29 in that optical transceivers 121b and 121c are connected to ports 13 and port 14, respectively. The wavelength of optical transceiver 121b is λ3 (λt3, λr3), and the wavelength of optical transceiver 121c is λ4 (λt4, λr4).

Optical wavelength multiplexer/demultiplexers 31a, 31b, 31c, and 31d subject optical signals from optical transceivers 121, 121a, 121b, and 121c to wavelength multiplexing and demultiplex a wavelength multiplexed signal from a PON line (not shown) into an optical signal with wavelength λr1, an optical signal with wavelength λr2, an optical signal with wavelength λr3, and an optical signal with wavelength λr4. This enables transmission of optical signals by 100 Gbps×4 channels. As shown in FIGS. 32 and 33, the embodiment of the present invention enables a transmission capacity of Day 3×4 by four ports on the host board.

Embodiment 2

The overall configuration of an optical communication system according to Embodiment 2 is identical to the configuration shown in FIG. 1. Specifically, a previous generation system and a new generation system coexist in Embodiment 2. In this embodiment, "previous generation system" refers to a system with low transmission capacity, and "new generation system" refers to a system with high transmission capacity.

In the description of Embodiment 2, the term "Day 0" refers to a stage before the transmission capacity is expanded, that is, a previous generation. In one embodiment, the transmission capacity in Day 0 is 10 Gbps.

Since a previous generation system with low transmission capacity has become widespread, a system in which a previous generation system and a new generation system coexist may be requested. For example, when a system of 10 G has been introduced, a new generation (25 G, 50 G, 100 G) system can preferably accommodate an existing system (10 G). Embodiment 2 provides a system that can coexist with a previous generation system.

Figure 34:
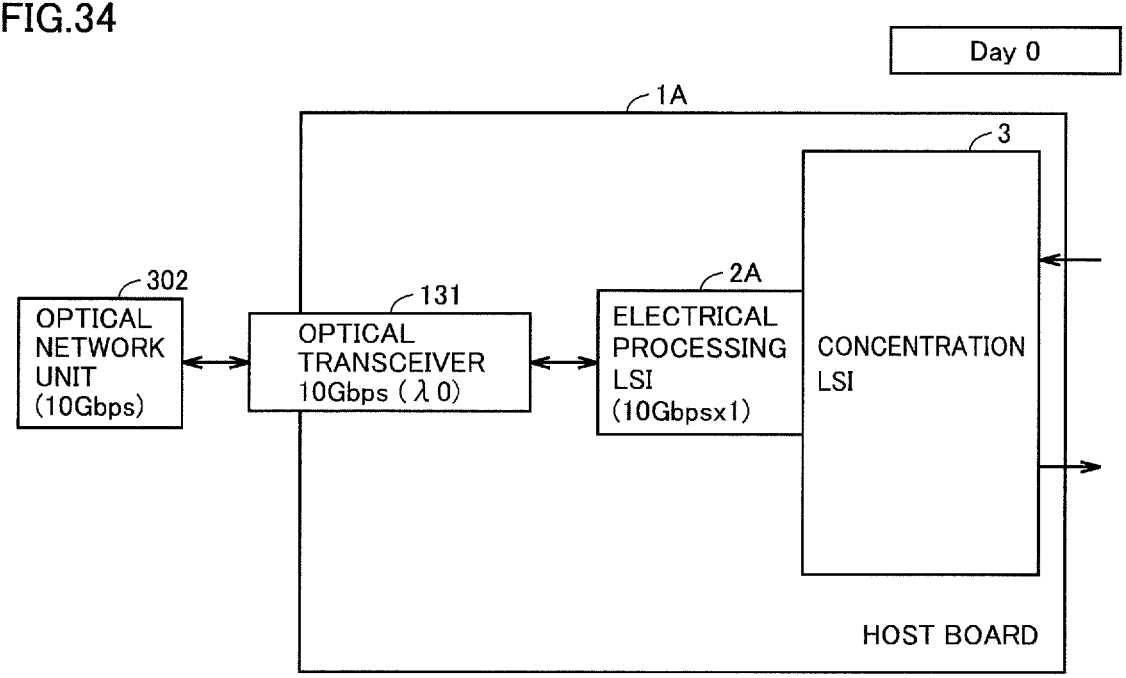
FIG. 34 shows a stage (Day 0) at which the transmission capacity is 10 Gbps.

FIG. 34 shows a stage (Day 0) at which the transmission capacity is 10 Gbps. In FIG. 34, an optical transceiver 131 (wavelength λ0) for 10 Gbps, an electrical processing LSI 2A, and a concentration LSI 3 are mounted on a host board 1A.

Figure 35:
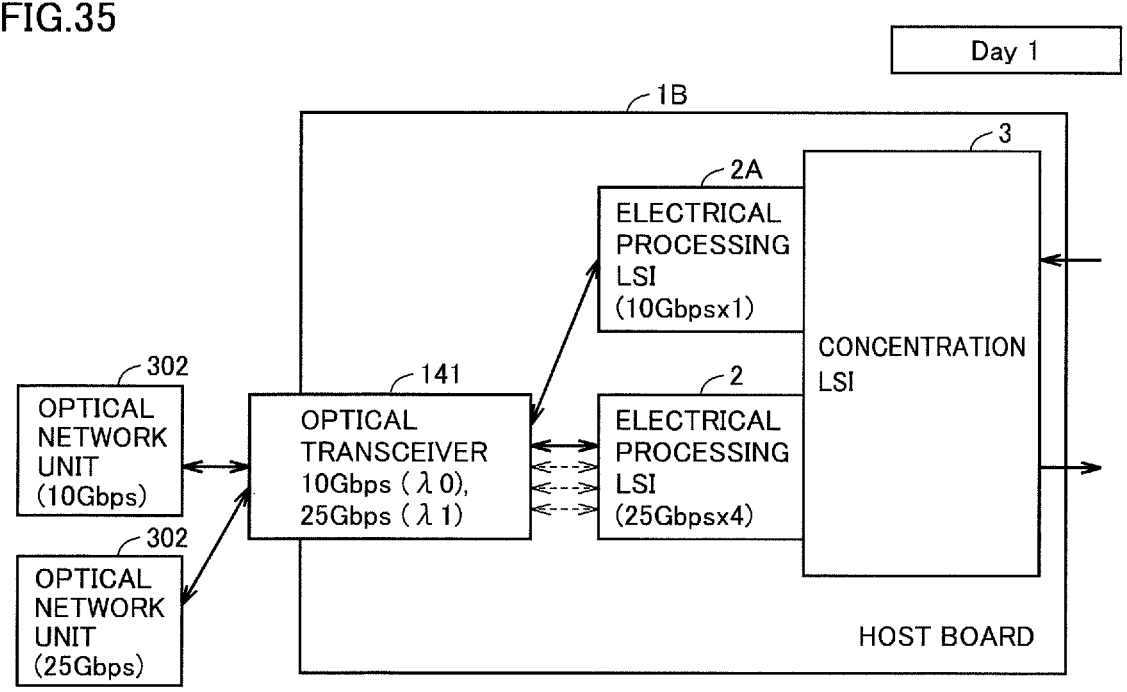
FIG. 35 shows a stage (Day 1) at which a system of 10 Gbps and a system of 25 Gbps coexist in one scenario of transmission capacity expansion.

FIG. 35 shows a stage (Day 1) at which a system of 10 Gbps and a system of 25 Gbps coexist in one scenario of transmission capacity expansion. In comparison between FIGS. 34 and 35, at the stage of Day 1, optical network unit 302 of 25 Gbps is introduced into a system in addition to optical network unit 302 of 10 Gbps. Thus, host board 1A is exchanged with a host board 1B. Optical transceiver 141, electrical processing LSIs 2 and 2A, and concentration LSI 3 are mounted on host board 1B.

Optical transceiver 141 can support both of transmission capacities of 10 Gbps (wavelength λ0) and 25 Gbps (wavelength λ1). Electrical processing LSI 2A communicates information with host board 1B externally, similarly to electrical processing LSI 2. Electrical processing LSI 2A is an LSI for transmission processing at 10 Gbps. Electrical processing LSI 2A differs from electrical processing LSI 2 in this respect.

Figure 36:
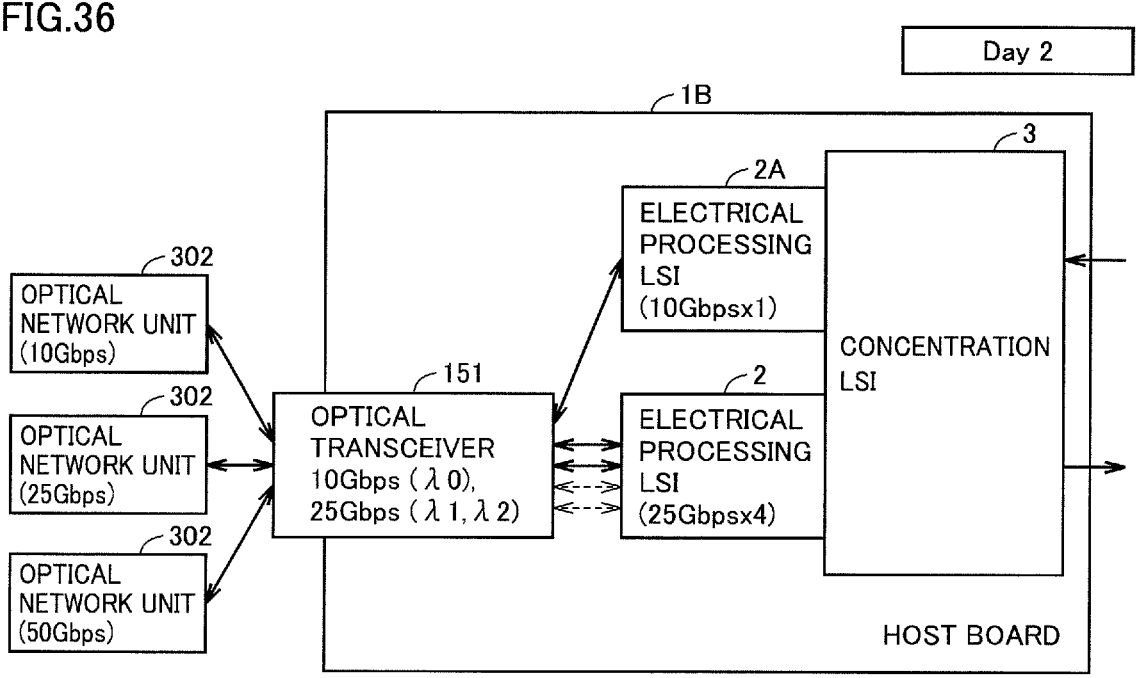
FIG. 36 shows a stage (Day 2) at which a system of 10 Gbps, a system of 25 Gbps, and a system of 50 Gbps coexist in one scenario of transmission capacity expansion.

FIG. 36 shows a stage (Day 2) at which a system of 10 Gbps, a system of 25 Gbps, and a system of 50 Gbps coexist in one scenario of transmission capacity expansion. In comparison with the configuration shown in FIG. 35, in FIG. 36, an optical transceiver 151 is mounted on host board 1B in place of optical transceiver 141. Optical transceiver 151 is an optical transceiver with 10 Gbps×1 wavelength (wavelength λ0) and 25 Gbps×2 wavelengths (λ1, λ2).

Figure 37:
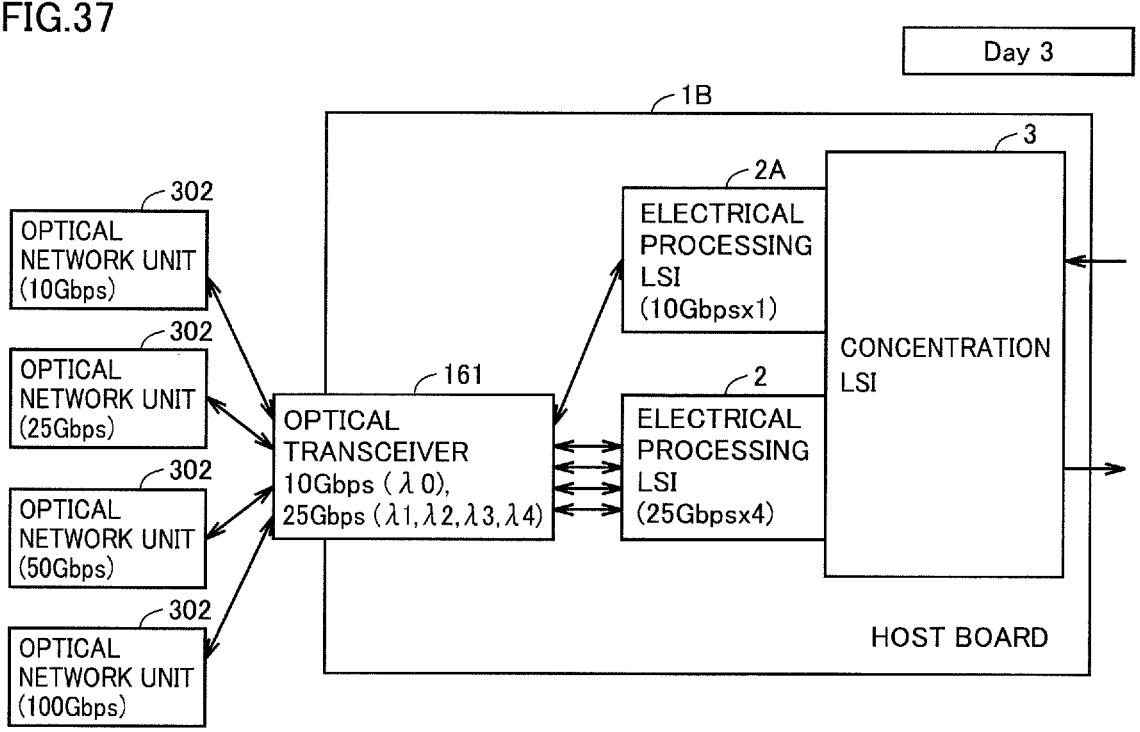
FIG. 37 shows a stage (Day 3) at which systems of 10 Gbps, 25 Gbps, 50 Gbps, and 100 Gbps coexist in one scenario of transmission capacity expansion.

FIG. 37 shows a stage (Day 3) at which systems of 10 Gbps, 25 Gbps, 50 Gbps, and 100 Gbps coexist in one scenario of transmission capacity expansion. In comparison with the configuration shown in FIG. 36, in FIG. 37, an optical transceiver 161 is mounted on host board 1B in place of optical transceiver 151. Optical transceiver 161 is an optical transceiver with 10 Gbps×1 wavelength (wavelength λ0) and 25 Gbps×4 wavelengths (λ1, λ2, λ3, λ4).

Figure 38:
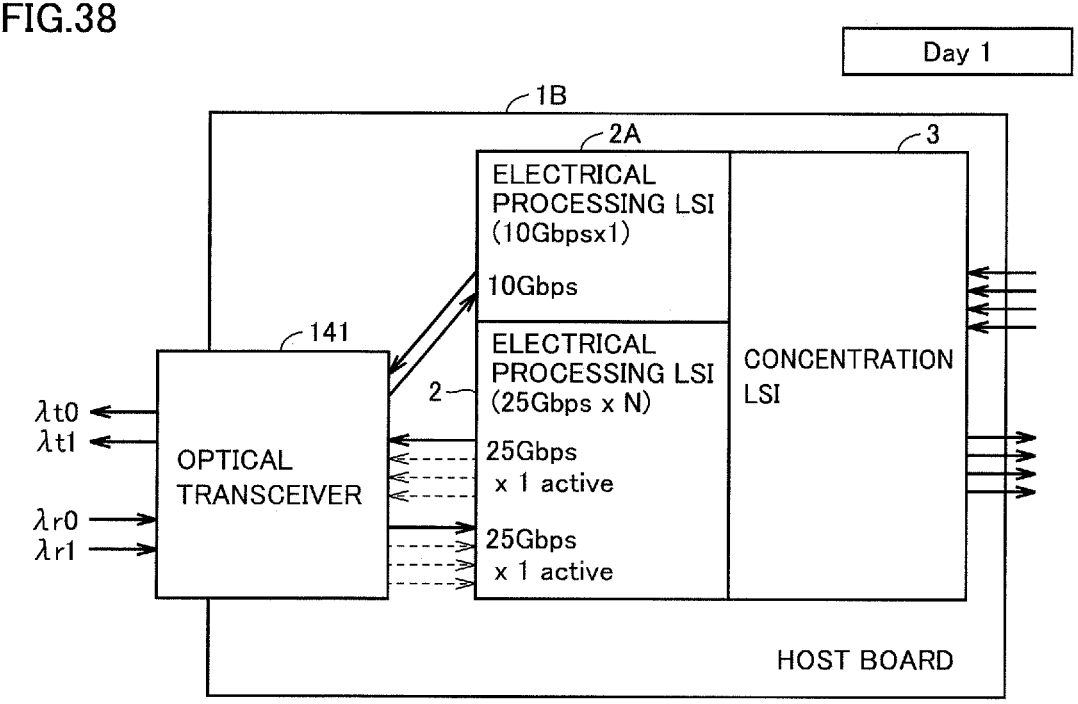
FIG. 38 shows one form of host board at the stage of Day 1.
Figure 39:
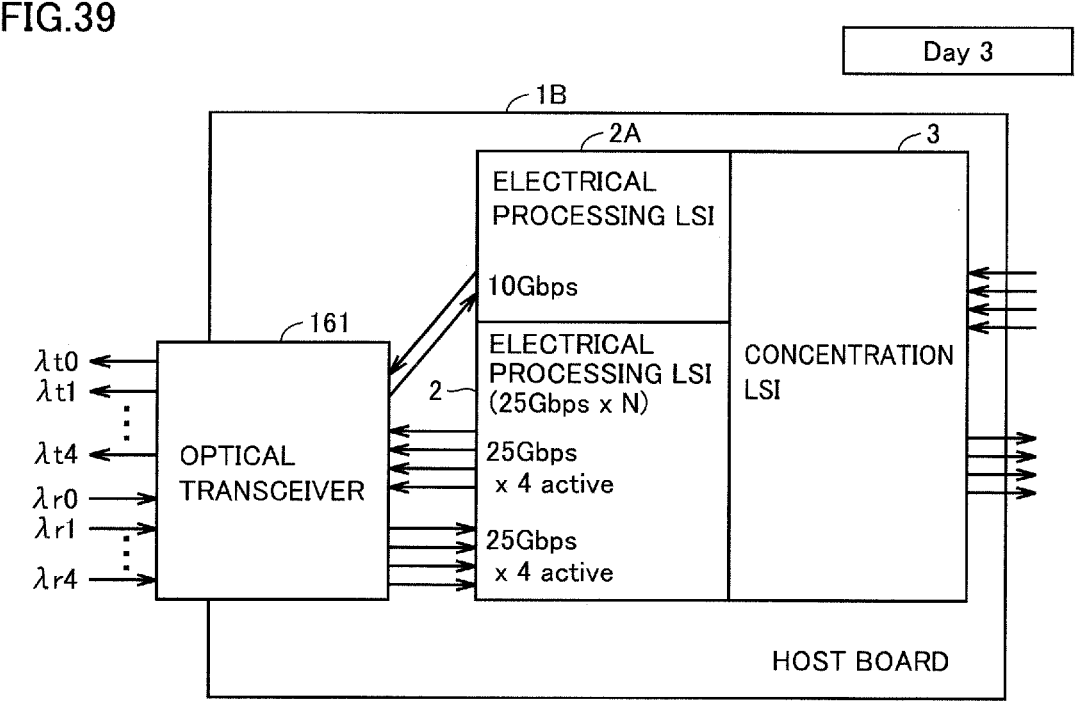
FIG. 39 shows one form of host board at the stage of Day 3.

FIG. 38 shows one form of host board at the stage of Day 1. FIG. 39 shows one form of host board at the stage of Day 3. As shown in FIGS. 38 and 39, host board 1B is configured to accommodate one previous generation (10 Gbps) lane and four new generation lanes. Electrical processing LSI 2A executes processing for transmission of 10 Gbps. Electrical processing LSI 2A executes processing for transmission in a plurality of lanes (N lanes) of 25 Gbps.

Optical transceivers 141 and 161 support a previous generation transmission capacity (e.g., 10 Gbps). Optical transceiver 141 implements one lane for new generation in addition to one lane for previous generation. Optical transceiver 161 implements four lanes for new generation in addition to one lane for previous generation. Optical transceiver 141 and optical transceiver 161 have the same form. Consequently, optical transceiver 141 is easily exchangeable with optical transceiver 161.

Figure 40:
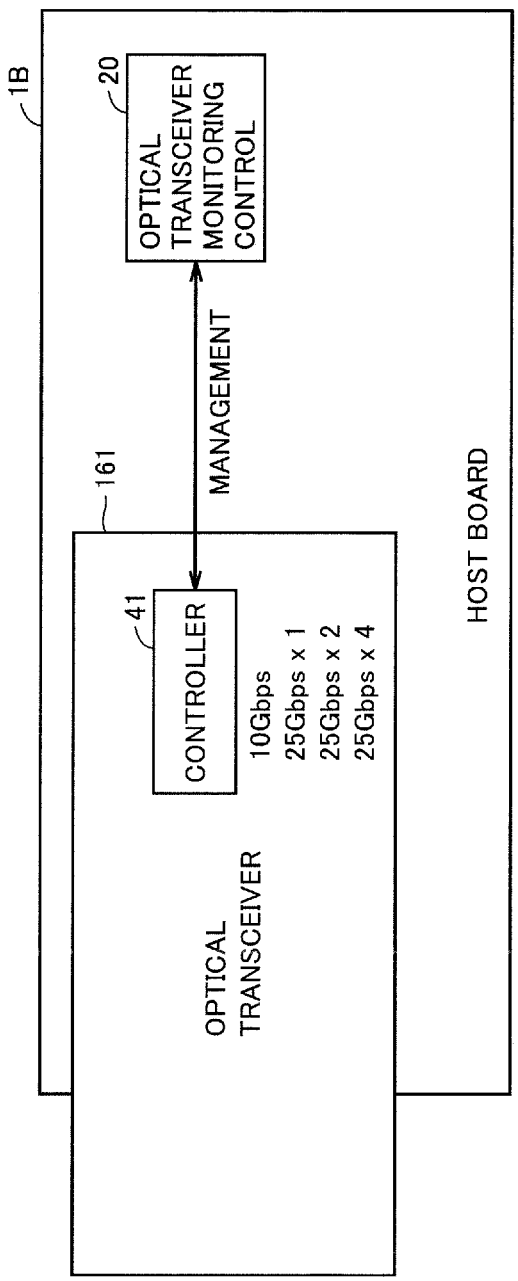
FIG. 40 is a block diagram schematically showing a configuration for transmission capacity control in Embodiment 2.

FIG. 40 is a block diagram showing a schematic configuration for controlling transmission capacity in Embodiment 2. With reference to FIG. 40, an optical transceiver monitoring control block 20 on host board 1B reads information on transmission capacity which is supported by an optical transceiver from controller 41 of the optical transceiver (e.g., optical transceiver 161). For example, optical transceiver monitoring control block 20 determines whether the optical transceiver corresponds to any of one lane, two lanes, and four lanes from the information from controller 41 of the optical transceiver. Further, optical transceiver monitoring control block 20 determines whether the optical transceiver corresponds to a previous generation (e.g., 10 Gbps) system from the information from controller 41 of the optical transceiver. Host board 1B controls a data flow in accordance with the rate (the number of lanes) at which a signal is received from and output to optical transceiver 161 and the presence or absence of a previous generation system, based on the information read by optical transceiver monitoring control block 20.

Figure 41:
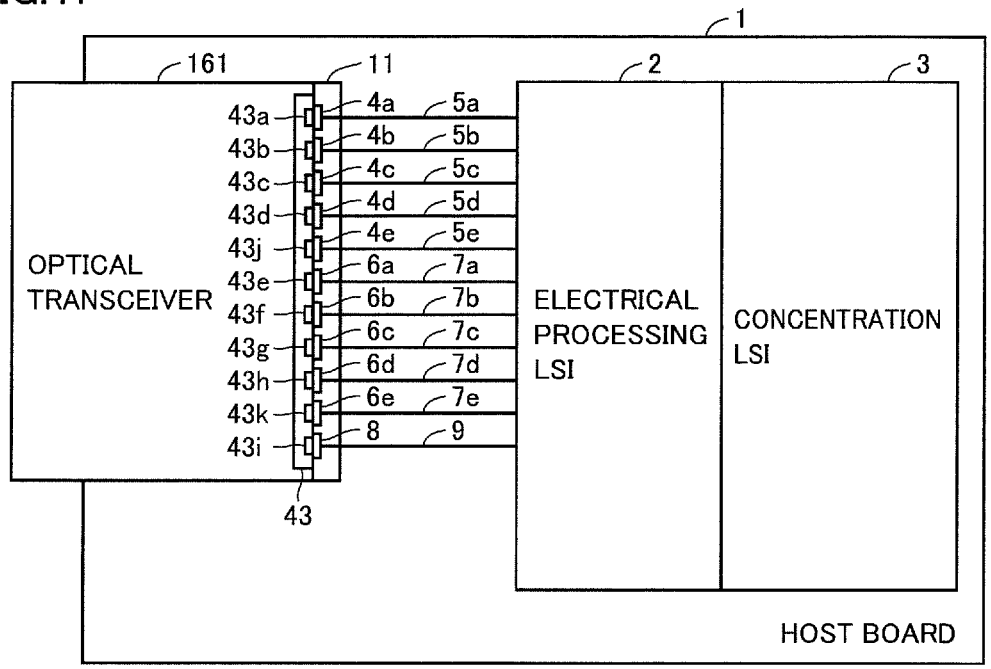
FIG. 41 schematically shows a configuration regarding the electric connection between an optical transceiver, a port, and an electrical processing LSI in Embodiment 2.

FIG. 41 schematically shows a configuration regarding the electric connection between an optical transceiver, a port, and an electrical processing LSI in Embodiment 2. FIG. 41 shows optical transceiver 161. As in the configuration shown in FIG. 6, in Embodiment 2, port 11 is implemented by a connector. In Embodiment 2, the connector has electrical contacts 4e and 6e in addition to electrical contacts 4a, 4b, 4c, 4d, 6a, 6b, 6c, 6d, and 8 shown in FIG. 6. Electrical contacts 4e and 6e are connected to high-rate signal lines 5e and 7e, respectively. In Embodiment 2, high-rate signal lines 5a, 5b, 5c, 5d, and 5e form one pair, and high-rate signal lines 7a, 7b, 7c, 7d, and 7e form another pair.

Optical transceiver 161 includes electrical interface 43. Electrical interface 43 has pins 43j and 43k in addition to pins 43a to 43i. With optical transceiver 161 connected to the connector (port 11), pins 43j and 43k are electrically connected to electrical contacts 4e and 6e, respectively. The other pins are similar to the corresponding pins of electrical interface 43 according to Embodiment 1, description of which will not be repeated.

Figure 42:
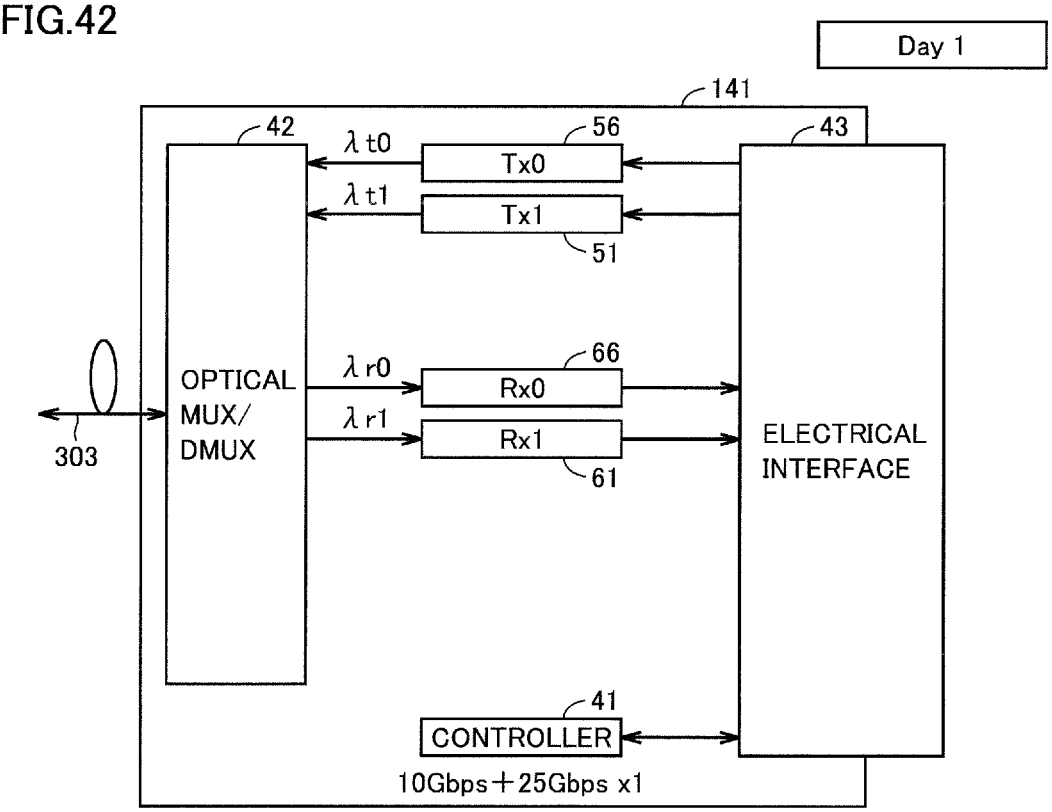
FIG. 42 shows an example configuration of the optical transceiver according to Embodiment 2.

FIG. 42 shows an example configuration of the optical transceiver according to Embodiment 2. As shown in FIG. 42, optical transceiver 141 supports lanes of 10 Gbps×1 and 25 Gbps×1. Optical transceiver 141 includes an optical transmission unit 56 and an optical reception unit 66 in addition to the configuration of optical transceiver 101 shown in FIG. 18.

Optical transmission unit 56 receives an electric signal through electrical interface 43 and converts the electric signal into an optical signal with wavelength $\lambda t0$. Optical transmission unit 56 outputs the optical signal to PON line 303 through optical wavelength multiplexer/demultiplexer 42. Optical reception unit 66 receives an optical signal with wavelength $\lambda r0$ from PON line 303 through optical wavelength multiplexer/demultiplexer 42 and converts the optical signal into an electric signal. Optical reception unit 66 outputs the electric signal to electrical interface 43. Detailed descriptions of optical transmission unit 56 and optical reception unit 66 will not be repeated.

Figure 43:
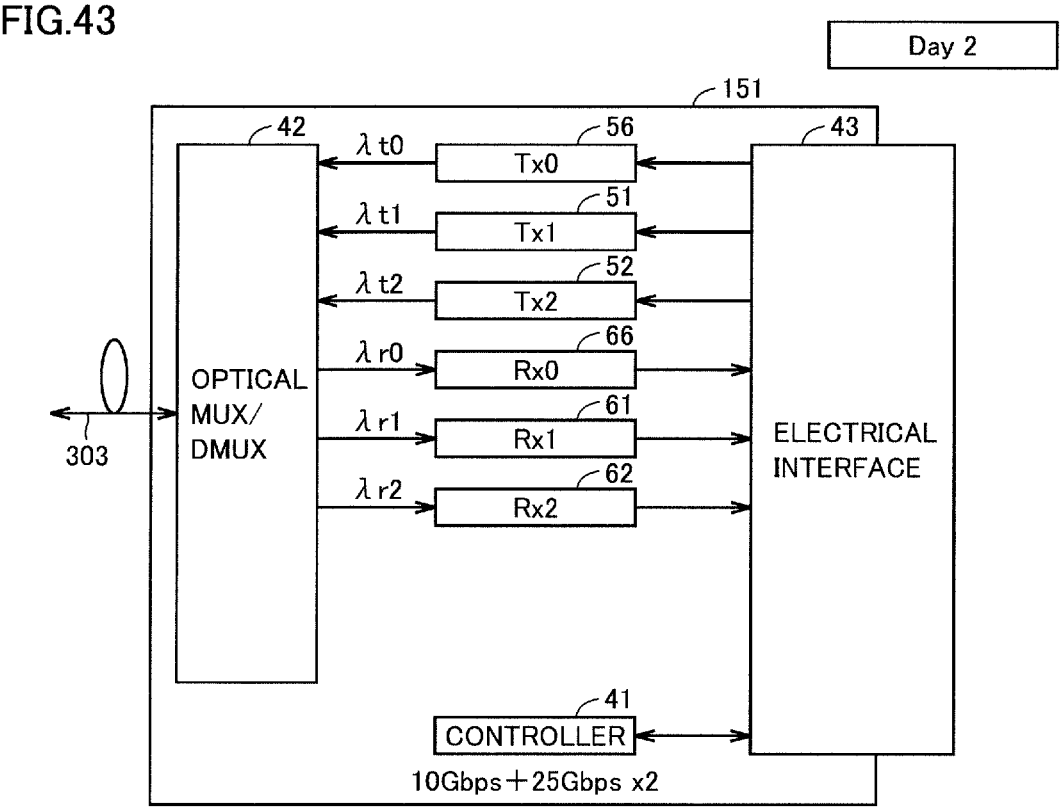
FIG. 43 shows another example configuration of the optical transceiver according to Embodiment 2.

FIG. 43 shows another example configuration of the optical transceiver according to Embodiment 2. As shown in FIG. 43, optical transceiver 151 supports lanes of 10 Gbps×1 and 25 Gbps×2. Optical transceiver 151 includes optical transmission unit 56 and optical reception unit 66 in addition to the configuration of optical transceiver 103 shown in FIG. 19.

Figure 44:
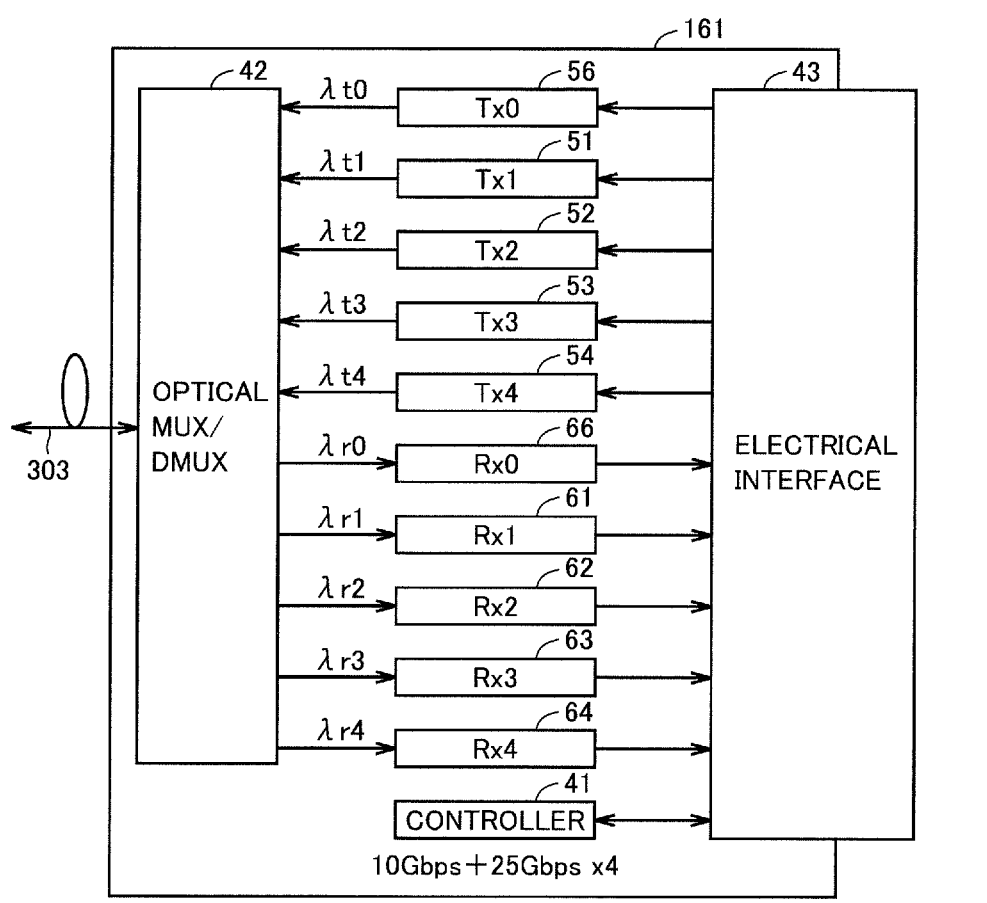
FIG. 44 shows a still another example configuration of the optical transceiver according to Embodiment 2.

FIG. 44 shows still another example configuration of the optical transceiver according to Embodiment 2. As shown in FIG. 44, optical transceiver 161 supports lanes of 10 Gbps×1 and 25 Gbps×4. Optical transceiver 161 includes optical transmission unit 56 and optical reception unit 66 in addition to the configuration of optical transceiver 103 shown in FIG. 19.

Figure 45:
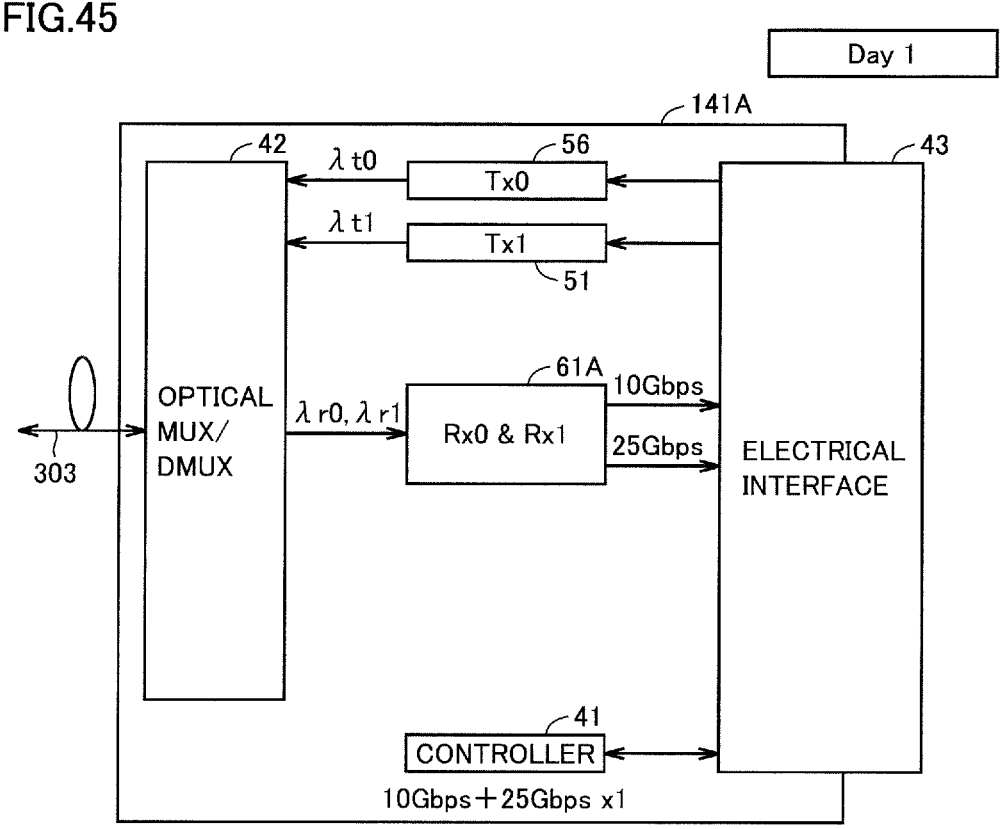
FIG. 45 shows another example configuration of an optical transceiver in which an existing transmission capacity and a large capacity can coexist.

FIG. 45 shows another example configuration of the optical transceiver in which an existing transmission capacity and a large capacity can coexist. As shown in FIG. 45, an optical transceiver 141A supports lanes of 10 Gbps×1 and 25 Gbps×1. In comparison with the configuration of optical transceiver 141 shown in FIG. 42, optical transceiver 141A includes an optical reception unit 61A in place of optical reception units 61 and 66. Optical reception unit 61A receives an optical signal obtained by time division multiplexing of wavelength $\lambda r0$ and wavelength $\lambda r1$ through optical wavelength multiplexer/demultiplexer 42 from PON line 303 and converts the optical signal into an electric signal. Optical reception unit 61A divides the electric signals to the lane for 10 Gbps and the lane for 25 Gbps and outputs the electric signals to electrical interface 43. Detailed description of optical reception unit 61A will not be repeated.

Figure 46:
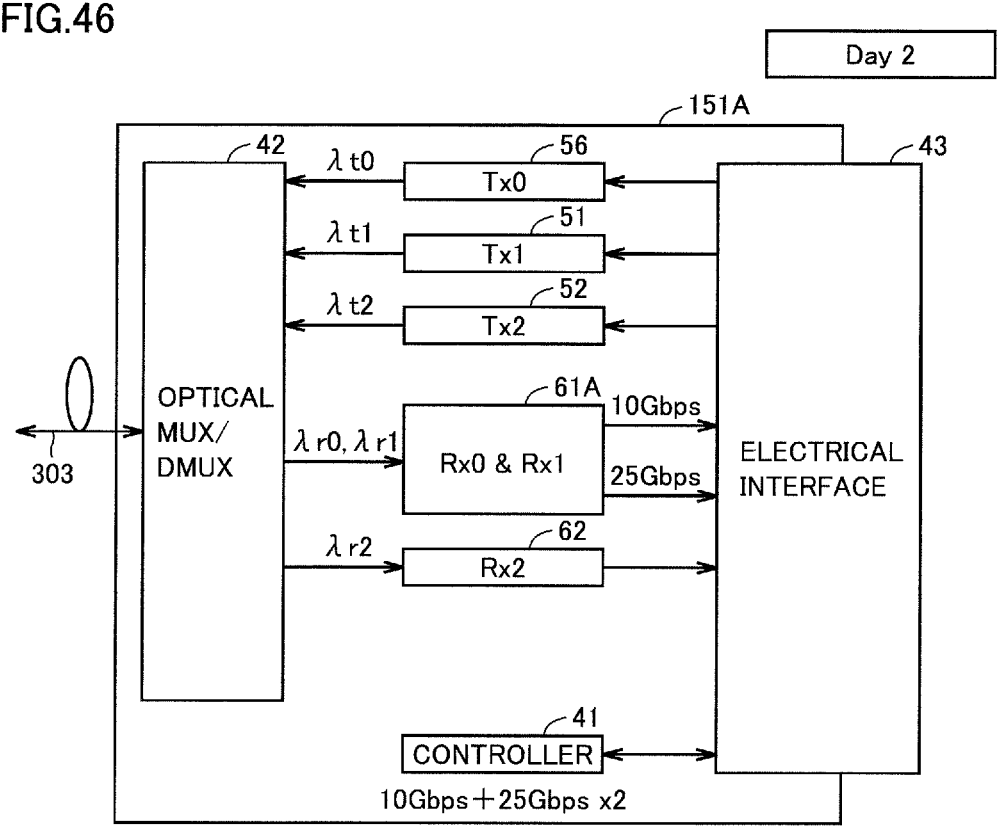
FIG. 46 shows another example configuration of an optical transceiver in which an existing transmission capacity and a large capacity can coexist.

FIG. 46 shows another example configuration of the optical transceiver in which an existing transmission capacity and a large capacity can coexist. As shown in FIG. 46, optical transceiver 151A supports lanes of 10 Gbps×1 and 25 Gbps×2. In comparison with the configuration of optical transceiver 151 shown in FIG. 43, optical transceiver 151A includes optical reception unit 61A in place of optical reception units 61 and 66.

Figure 47:
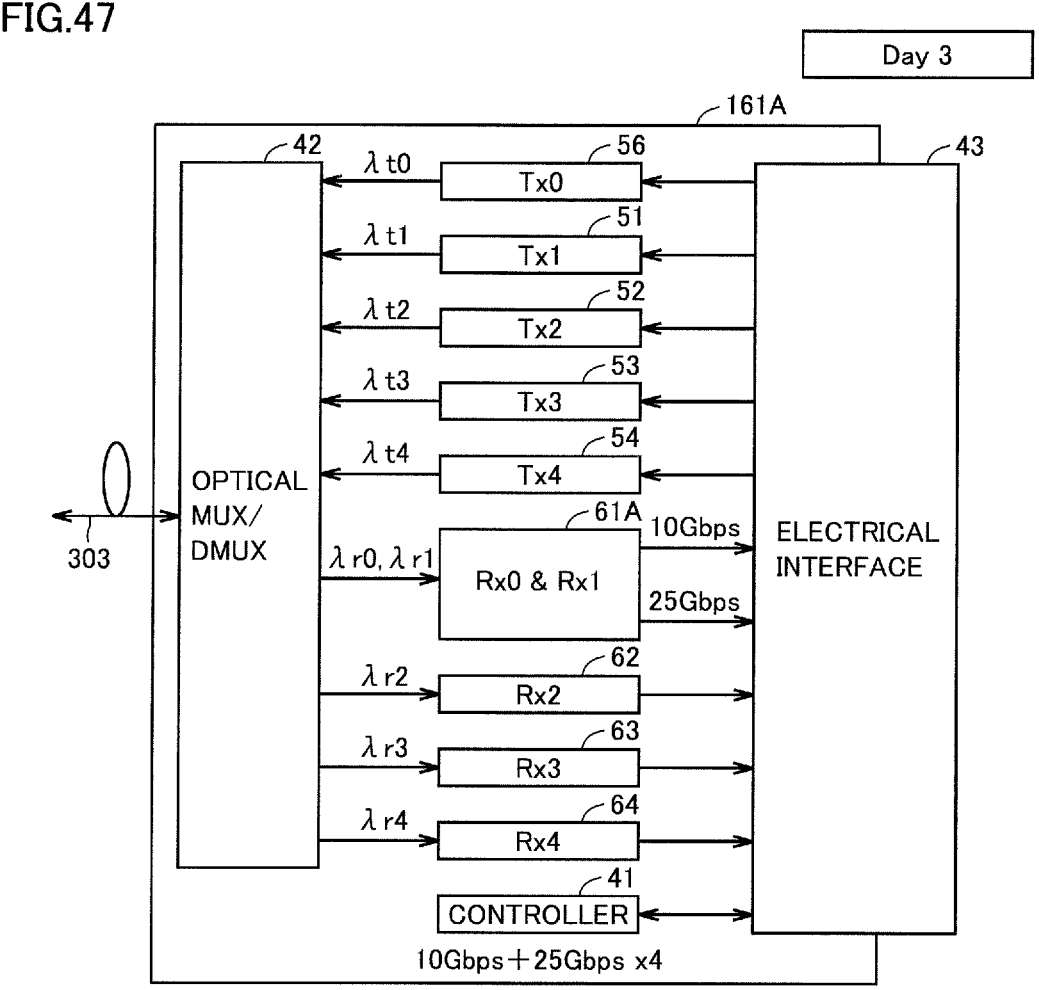
FIG. 47 shows still another example configuration of an optical transceiver in which an existing transmission capacity and a large capacity can coexist.

FIG. 47 shows still another example configuration of the optical transceiver in which an existing transmission capacity and a large capacity can coexist. As shown in FIG. 47, optical transceiver 161A supports lanes of 10 Gbps×1 and 25 Gbps×4. In comparison with the configuration of optical transceiver 161 shown in FIG. 44, optical transceiver 161A includes optical reception unit 61A in place of optical reception units 61 and 66.

Figure 48:
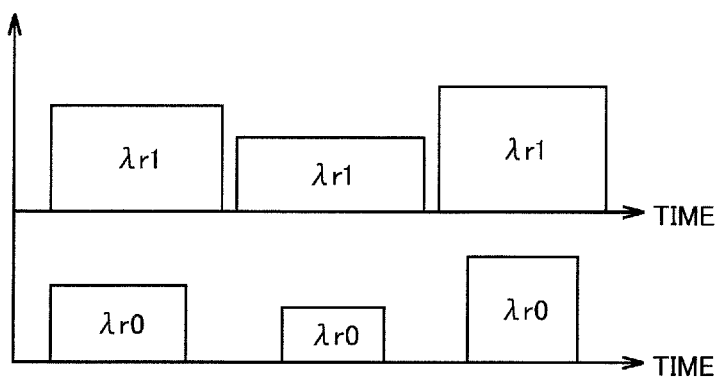
FIG. 48 is a diagram for illustrating reception of optical signals by the optical transceiver shown in FIGS. 42 to 44.

FIG. 48 is a diagram for illustrating the reception of an optical signal by the optical transceiver shown in FIGS. 42 to 44. As shown in FIG. 48, an optical signal with wavelength $\lambda r0$ and an optical signal with wavelength $\lambda r1$ coexist in PON line 303 by wavelength division multiplexing (WDM). Thus, optical wavelength multiplexer/demultiplexer 42 separates an optical signal with wavelength $\lambda r0$ and an optical signal with wavelength $\lambda r1$ from each other.

Figure 49:
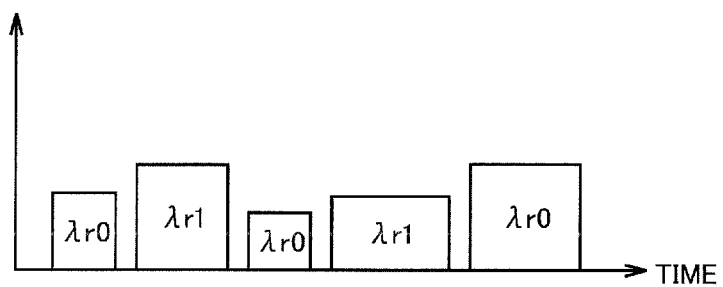
FIG. 49 is a diagram for illustrating reception of optical signals by the optical transceiver shown in FIGS. 45 to 47.

FIG. 49 is a diagram for illustrating the reception of an optical signal by the optical transceiver shown in FIGS. 45 to 47. As shown in FIG. 49, an optical signal with wavelength $\lambda r0$ and an optical signal with wavelength $\lambda r1$ coexist in PON line 303 by time division multiplexing (TDM). Optical wavelength multiplexer/demultiplexer 42 does not separate an optical signal with wavelength $\lambda r0$ and an optical signal with wavelength $\lambda r1$ from each other. Thus, optical reception unit 61A receives time division multiplexed signals (an optical signal with wavelength $\lambda r0$ and an optical signal with wavelength $\lambda r1$). The optical transceiver shown in FIGS. 42 to 47 transmits an optical signal by WDM.

Figure 50:
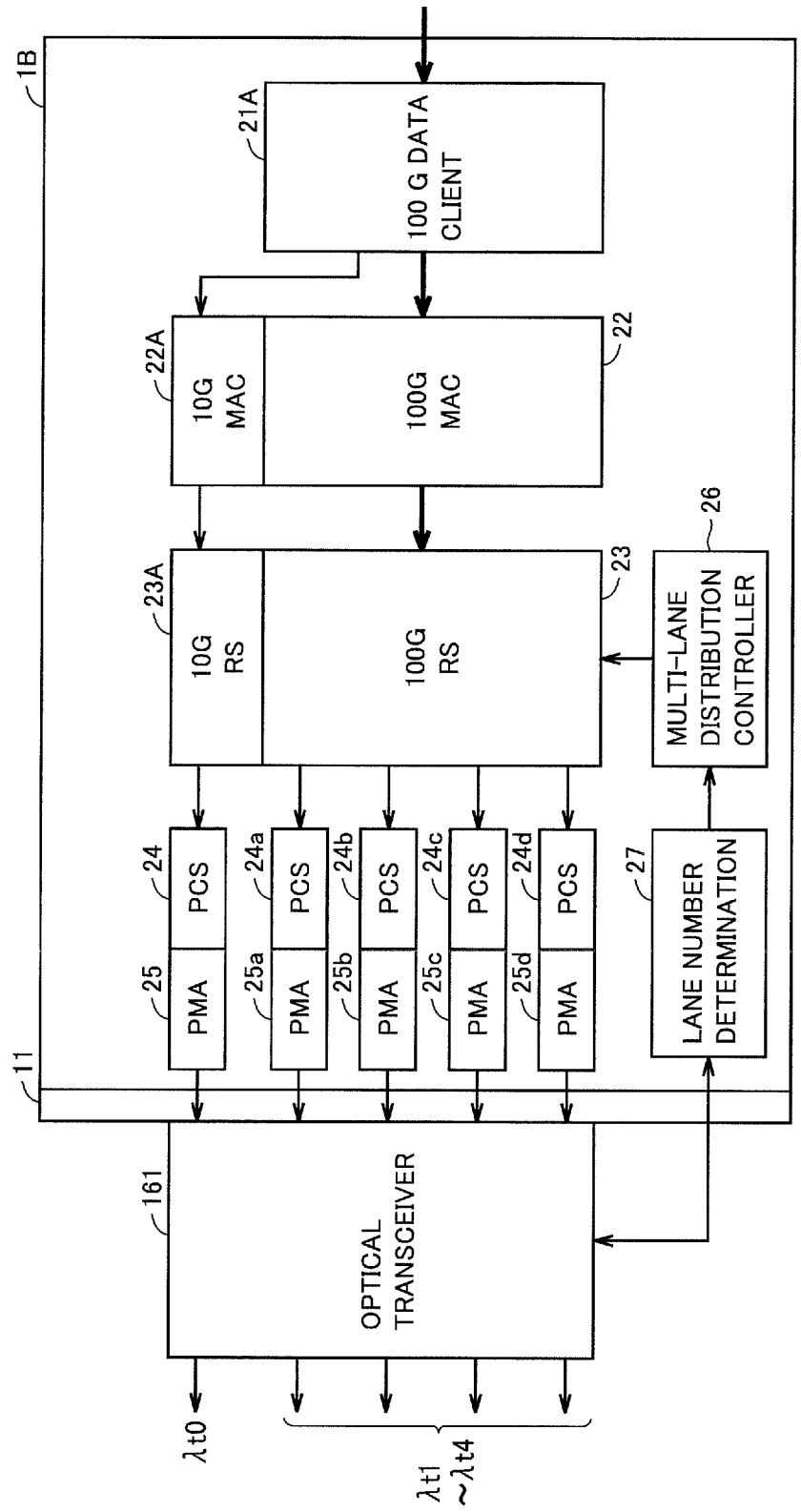
FIG. 50 is a block diagram showing a schematic configuration regarding downstream signal processing of the electrical processing LSI according to Embodiment 2.

FIG. 50 is a block diagram showing a schematic configuration regarding downstream signal processing of electrical processing LSI according to Embodiment 2. With reference to FIG. 50, a host board 1B additionally has a configuration for downstream data transmission for 10 Gbps, in addition to the configuration shown in FIG. 7. Specifically, the configuration for 10 Gbps includes a MAC 22A, an RS 23A, a PCS 24, and a PMA 25. Further, a 100 G data client block 21A divides data lanes as a data transfer unit in accordance with a transmission capacity requested by a user. The lane for 10 Gbps is defined as "Lane 0" below.

100 G data client block 21A, MACs 22 and 22A, RSs 23 and 23A, and PCS 24 and 24a to 24d, and PMAs 25 and 25a to 25d implement a communication unit that communicates externally and communicates with an optical transceiver through a connector. Multi-lane distribution controller 26 and lane number determination unit 27 implement a management unit on host board 1B. The management unit implements optical transceiver monitoring control block 20 shown in FIG. 40. The management unit receives lane information regarding an available lane of an optical transceiver from controller 41 of the optical transceiver (see FIG. 40) through the connector. The management unit specifies an electrical contact of a connector corresponding to the available lane, that is, an available electrical contact of the connector.

FIG. 51 shows a first example of the lane information according to Embodiment 2. FIG. 52 shows a second example of the lane information according to Embodiment 2. FIG. 53 shows a third example of the lane information according to Embodiment 2. In Embodiment 2, the information on Lane 0 is added to the lane information shown in FIGS. 8, 9, and 11. Thus, a plurality of lanes include a first lane (Lane 0) for a first transmission capacity (10 G) of an optical transceiver, an optical transmitter, and an optical receiver, and a second lane (Lane 1, Lane 2, Lane 3, Lane 4) for a second transmission capacity (25 G, 50 G, 100 G) of an optical transceiver, an optical transmitter, and an optical receiver, which differs from the first transmission capacity. This allows coexistence of a previous generation system having a low transmission capacity and a new regeneration system having a high transmission capacity.

Since an optical network unit is installed per service subscriber, a system includes an optical network unit having a different transmission capacity. In Embodiment 2, the optical line terminal allows coexistence of a previous generation system and a new generation system only by exchange of optical transceivers. Further, in Embodiment 2, a new generation system can incrementally upgrade transmission capacity without exchanging host boards. Consequently, Embodiment 2 can achieve high scalability while preventing the configuration of the optical line terminal from becoming complicated.

All the embodiments of the present invention can exchange an optical transceiver connected to a host board to incrementally change transmission capacity. Note that all the embodiments described above show a scenario of expanding transmission capacity. In all the embodiments of the present invention, however, the scenario of changing transmission capacity can include downgrading of transmission capacity.

Further, all the embodiments of the present invention can implement an optical receiver that notifies a host board of lane information by a wavelength demultiplexing unit, at least one optical receiver, an electrical interface, and a controller (communication unit) of an optical transceiver. Similarly, all the embodiments of the present invention can implement an optical transmitter that notifies a host board of lane information by a wavelength multiplexing unit, at least one optical transmission unit, an electrical interface, and a controller (communication unit) of an optical transceiver.

Each embodiment above has described an example of 25 G×4. All the embodiments of the present invention can also support a transmission capacity of 40 G (10 G×4), incrementally upgrade transmission capacity from 10 G to 40 G, and support coexistence of a previous generation (10 G) and a new generation (expansion from 10 G to 40 G).

The embodiments disclosed herein should be considered illustrative in every respect, not limitative. The scope of the present invention is defined not by the above-described embodiments but by the claims. It is intended that the scope of the present invention includes any modification within the scope and meaning equivalent to the scope of the claims.

REFERENCE SIGNS LIST

1, 1A, 1B host board, 2, 2A electrical processing LSI, 3 concentration LSI, 4a, 4b, 4c, 4d, 4e, 6a, 6b, 6c, 6d, 6e, 8 electrical contact, 5a, 5b, 5c, 5d, 5e, 7a, 7b, 7c, 7d, 7e high-rate signal line, 9 control signal line, 11, 12, 13, 14 port, 20 optical transceiver monitoring control block, 21 data transfer unit, 22, 22A MAC, 23, 23A RS, 24, 24a-24d PCS, 25, 25a-25d PMA, 26 multi-lane distribution controller, 27 lane number determination unit, 31, 31a, 31b, 31c, 31d, 42 optical wavelength multiplexer/demultiplexer, 41 controller, 43 electrical interface, 43a-43i pin, 44 clock data recovery IC, 45 power supply IC, 46 temperature control IC, 48 Peltier device, 50, 50A transmission module, 51, 52, 53, 54 optical transmission unit, 55 optical wavelength multiplexer, 60, 60A reception module, 61, 61A, 62, 63, 64, 66 optical reception unit, 65 wavelength demultiplexer, 101, 101a, 102, 103, 103a, 104, 111, 111a, 112, 121, 121a, 121b, 121c, 122, 131, 141, 141A, 151, 151A, 161, 161A optical transceiver, 300 PON system, 301 optical line terminal, 302 optical network unit, 303 PON line, 304 optical splitter, 305 trunk optical fiber, 306 branch optical fiber, S1-S5 step.

The invention claimed is:

1. A host board for mounting an optical transceiver, the host board comprising:
   a connector configured to attach thereto and detach therefrom the optical transceiver having at least one lane, the connector including at least one electrical contact corresponding to the at least one lane;
   a management unit configured to receive lane information regarding an available lane of the optical transceiver from the optical transceiver through the connector and specify the at least one electrical contact that is available; and
   a communication unit configured to communicate with the optical transceiver through the connector,
   the communication unit being configured to communicate information with the optical transceiver through the at least one electrical contact specified by the management unit.

2. The host board according to claim 1, wherein the lane information includes at least one of
   information indicating whether each of the at least one lane is implemented, and
   information regarding a wavelength of an optical signal.

3. The host board according to claim 1, wherein
   the lane information includes information regarding a communication rate of the optical transceiver, and
   the management unit is configured to specify the at least one electrical contact that is available based on the information regarding the communication rate.

4. The host board according to claim 1, wherein the connector includes four electrical contacts corresponding to four lanes.

5. The host board according to claim 1, wherein the at least one lane includes
   a first lane for a first communication rate of the optical transceiver, and a second lane for a second communication rate of the optical transceiver, the second communication rate differing from the first communication rate.

6. The host board according to claim 1, wherein the management unit is configured to detect connection of the optical transceiver to the connector and reads the lane information from the optical transceiver.

7. An optical receiver comprising:
a wavelength demultiplexing unit configured to separate at least one optical signal to be received from an optical signal transmitted through an optical fiber and subjected to wavelength multiplexing;
at least one optical reception unit configured to receive the at least one optical signal to be received and output an electric signal;
an interface including an electrical contact for outputting the electric signal from the at least one optical reception unit to a host board; and
a communication unit configured to notify information to the host board, the information specifying:
an electrical contact available for transmitting the electric signal from the at least one optical reception unit to the host board, and
the at least one optical reception unit.

8. The optical receiver according to claim 7, wherein the information includes information indicating whether each of a plurality of lanes is implemented.

9. The optical receiver according to claim 8, wherein the plurality of lanes include
a first lane for a first communication rate of the optical receiver, and
a second lane for a second communication rate of the optical receiver, the second communication rate differing from the first communication rate.

10. The optical receiver according to claim 8, wherein the information includes information regarding a communication rate of the optical receiver.

11. An optical transmitter comprising:
at least one optical transmission unit configured to receive an electric signal from a host board and transmit at least one optical signal having an identical wavelength or different wavelengths, wherein when the at least one optical transmission unit is a plurality of optical transmission units, the plurality of optical transmission units transmit optical signals having different wavelengths;
a wavelength multiplexing unit configured to
transmit the at least one optical signal from the at least one optical transmission unit to an optical fiber, and
when the optical signals from the plurality of optical transmission units have different wavelengths, transmit an optical signal subjected to wavelength multiplexing to the optical fiber,
an interface including an electrical contact for receiving an electric signal from the host board; and
a communication unit configured to notify information to the host board, the information specifying:
the electrical contact available for transmitting the electric signal from the host board to the at least one optical transmission unit, and
the at least one optical transmission unit.

12. The optical transmitter according to claim 11, wherein the information includes information indicating whether each of a plurality of lanes is implemented.

13. The optical transmitter according to claim 12, wherein the plurality of lanes include
a first lane for a first communication rate of the optical transmitter, and
a second lane for a second communication rate of the optical transmitter, the second communication rate differing from the first communication rate.

14. The optical transmitter according to claim 12, wherein the information includes information regarding a communication rate of the optical transmitter.

15. An optical transceiver comprising:
a wavelength demultiplexing unit configured to separate at least one optical signal to be received from an optical signal transmitted through an optical fiber and subjected to wavelength multiplexing;
a wavelength multiplexing unit integral with the wavelength demultiplexing unit or separate from the wavelength demultiplexing unit;
at least one optical reception unit configured to receive the at least one optical signal to be received;
at least one optical transmission unit configured to receive an electric signal from a host board and output an optical signal;
an interface having a first electrical contact for receiving an electric signal from the host board and a second electrical contact for outputting an electric signal from the at least one optical reception unit to the host board, the interface being adapted to a plurality of lanes; and
a communication unit configured to notify information to the host board, the information specifying the at least one optical reception unit, the at least one optical transmission unit, the first electrical contact available for transmitting the electric signal from the host board to the at least one optical transmission unit, and the second electrical contact available for transmitting the electric signal from the at least one optical reception unit to the host board.

16. A method of mounting an optical transceiver on a host board, the method comprising:
connecting an optical transceiver storing lane information regarding an available lane of the optical transceiver to a connector of a host board;
reading the lane information from the optical transceiver;
determining a number of lanes based on the lane information; and
performing control for multi-lane distribution based on the number of lanes.

17. The method according to claim 16, further comprising connecting another optical transceiver having a communication rate higher than that of the optical transceiver to the connector in place of the optical transceiver.

18. The method according to claim 16, further comprising connecting another optical transceiver to the connector in place of the optical transceiver, the other optical transceiver having a first communication rate identical to a communication rate of the optical transceiver and a second communication rate higher than the communication rate of the optical transceiver.

19. A host board for mounting an optical transceiver, the host board comprising:
a connector configured to attach thereto and detach therefrom the optical transceiver having at least one lane;
a management unit configured to receive lane information regarding an available lane of the optical transceiver from the optical transceiver through the connector and specify the available lane; and
a communication unit configured to communicate with the optical transceiver through the connector, the communication unit being configured to communicate data with the optical transceiver, the data being transmitted through the available lane specified by the management unit.

20. An optical receiver comprising:
a wavelength demultiplexing unit configured to separate at least one optical signal to be received from an optical signal transmitted through an optical fiber and subjected to wavelength multiplexing;
at least one optical reception unit configured to receive the at least one optical signal to be received and output an electric signal;
an interface for outputting the electric signal from the at least one optical reception unit to a host board; and
a communication unit configured to notify information to the host board, the information specifying:
    a lane available for transmitting an electric signal from the at least one optical reception unit to the host board, and
    the at least one optical reception unit.

21. An optical transmitter comprising:
at least one optical transmission unit configured to receive an electric signal from a host board and transmit at least one optical signal having an identical wavelength or different wavelengths, wherein when the at least one optical transmission unit is a plurality of optical transmission units, the plurality of optical transmission units transmit optical signals having different wavelengths;
a wavelength multiplexing unit configured to
    transmit the at least one optical signal from the at least one optical transmission unit to an optical fiber, and
    when the optical signals from the plurality of optical transmission units have different wavelengths, transmit an optical signal subjected to wavelength multiplexing to the optical fiber;
an interface for receiving an electric signal from the host board; and
a communication unit configured to notify information to the ho board, the information specifying
    a lane available for transmitting the electric signal from the host board to the at least one optical transmission unit, and
    the at least one optical transmission unit.

22. An optical transceiver comprising:
a wavelength demultiplexing unit configured to separate at least one optical signal to be received from an optical signal transmitted through an optical fiber and subjected to wavelength multiplexing;
a wavelength multiplexing unit integral with the wavelength demultiplexing unit or separate from the wavelength demultiplexing unit;
at least one optical reception unit configured to receive the at least one optical signal to be received;
at least one optical transmission unit configured to receive an electric signal from a host board and output an optical signal;
an interface for receiving an electric signal from the host board and outputting an electric signal from the at least one optical reception unit to the host board; and
a communication unit configured to notify information to the host board, the information specifying the at least one optical reception unit, the at least one optical transmission unit, and a lane available for transmitting the electric signal from the host board to the at least one optical transmission unit and transmitting the electric signal from the at least one optical reception unit to the host board.

* * * * *